US012744787B1

(12) United States Patent
Lee

(10) Patent No.: US 12,744,787 B1
(45) Date of Patent: Sep. 22, 2026

(54) ATTESTED CHECKOUT COMPLIANCE GATEWAY WITH PAYMENT-CREDENTIAL CONFINEMENT, TRANSACTION-SCOPED EVIDENCE BUNDLES, AND FAIL-CLOSED PURCHASE CONTROL

(71) Applicant: Yong Bok Lee, Sheridan, WY (US)

(72) Inventor: Yong Bok Lee, Sheridan, WY (US)

(73) Assignee: STONE & INK ARCHIVE LLC, Sheridan, WY (US)

( * ) Notice: Subject to any disclaimer, the term of this patent is extended or adjusted under 35 U.S.C. 154(b) by 0 days.

(21) Appl. No.: 19/574,766

(22) Filed: Mar. 23, 2026

Related U.S. Application Data

(60) Provisional application No. 63/869,567, filed on Aug. 25, 2025.

(51) Int. Cl.
*H04L 9/40* (2022.01)
*G06F 21/62* (2013.01)
*H04L 9/08* (2006.01)

(52) U.S. Cl.
CPC ........ *H04L 63/102* (2013.01); *G06F 21/6245* (2013.01); *H04L 9/088* (2013.01)

(58) Field of Classification Search
CPC .... H04L 63/102; H04L 9/088; G06F 21/6245
See application file for complete search history.

(56) References Cited

U.S. PATENT DOCUMENTS 8,834,251 B2 9/2014 Yacenda
9,485,206 B2 11/2016 Day, II et al.
(Continued)

FOREIGN PATENT DOCUMENTS

CA 3017913 A1 * 3/2019 ......... G06Q 20/1085
WO WO-2017000061 A1 * 1/2017 ........... G06Q 20/382

OTHER PUBLICATIONS

OFCOM(Office of Communications). Part 3 Guidance on highly effective age assurance. Apr. 24, 2025. (PDF, 26 pp.) London, UK.
(Continued)

*Primary Examiner* — Shahriar Zarrineh

(57) ABSTRACT

An attested checkout gateway interposes a checkout sidecar before a merchant checkout interface to classify purchase-request fields and prevent primary account number data and sensitive authentication data from being processed by a merchant application process. A payment execution enclave within a trusted compute boundary verifies remote attestation before unsealing a payment credential, confines credential use to the trusted compute boundary, and generates a network-routable payment instrument while enforcing non-export of primary account number data and sensitive authentication data. A data-flow confinement digest is computed from measured confinement inputs. Responsive to evaluation under an applicable policy profile, the gateway either obtains step-up authentication evidence or generates a signed policy-evaluation record. A digitally signed compliance evidence bundle binds an attestation measurement, the data-flow confinement digest, an authorization trace digest, and the authentication evidence or signed policy-evaluation record, and fail-closed control blocks purchase completion or settlement when required trust conditions are unmet.

23 Claims, 11 Drawing Sheets

(56) References Cited

U.S. PATENT DOCUMENTS

| | | | | |
|---|---|---|---|---|
| 10,037,517 | B1 * | 7/2018 | Chi | G06Q 20/4016 |
| 10,237,280 | B2 | 3/2019 | Day, II et al. | |
| 10,366,378 | B1 * | 7/2019 | Han | G06Q 20/204 |
| 10,460,324 | B1 * | 10/2019 | Westen | G06F 11/0709 |
| 11,082,233 | B2 | 8/2021 | Yang et al. | |
| 11,544,797 | B1 * | 1/2023 | Cohen | G06Q 10/10 |
| 11,556,959 | B2 | 1/2023 | Fournier et al. | |
| 11,924,219 | B1 | 3/2024 | Campbell et al. | |
| 12,013,924 | B1 | 6/2024 | Hanson et al. | |
| 2001/0044764 | A1 * | 11/2001 | Arnold | G06Q 20/04<br>705/35 |
| 2009/0006203 | A1 * | 1/2009 | Fordyce, III | G06Q 20/387<br>705/14.1 |
| 2010/0057598 | A1 * | 3/2010 | Bercy | G06Q 40/00<br>705/35 |
| 2011/0072039 | A1 | 3/2011 | Tayloe | |
| 2012/0106805 | A1 | 5/2012 | Shuster | |
| 2015/0100433 | A1 * | 4/2015 | Choy | G06Q 30/0635<br>705/26.81 |
| 2015/0186962 | A1 | 7/2015 | Krell | |
| 2016/0210621 | A1 | 7/2016 | Khan | |
| 2017/0046716 | A1 | 2/2017 | Sheehan et al. | |
| 2017/0075938 | A1 | 3/2017 | Black et al. | |
| 2017/0359184 | A1 | 12/2017 | Camenisch et al. | |
| 2018/0225657 | A1 * | 8/2018 | Agarwalla | G06Q 20/12 |
| 2020/0167775 | A1 * | 5/2020 | Reese | G06Q 20/38215 |
| 2020/0250646 | A1 * | 8/2020 | Jooste | G06Q 20/326 |
| 2020/0259663 | A1 | 8/2020 | Firsov | |
| 2022/0005047 | A1 | 1/2022 | Maheshwari et al. | |
| 2023/0155812 | A1 * | 5/2023 | Bennison | H04L 9/0825<br>713/171 |
| 2024/0022433 | A1 | 1/2024 | Asor et al. | |
| 2024/0195629 | A1 | 6/2024 | Hanson et al. | |
| 2024/0256629 | A1 | 8/2024 | Whitney et al. | |
| 2025/0053961 | A1 * | 2/2025 | Deliwala | G06Q 20/3267 |

OTHER PUBLICATIONS

Temoshok, D.; Abruzzi, C.; Choong, Y.-Y.; et al. NIST SP 800-63A-4: Identity Proofing and Enrollment. NIST, Jul. 2025.

Allen, T.; McColl, L.; Walters, K.; Lyon, M. Measurement of Age Assurance Technologies—Pt. 2. ICO/Ofcom report, UK, 2023.

COPPA Rule (16 CFR Part 312)—Final Rule Amendments / source notice—FTC / eCFR—Jan. 17, 2013.

Age Appropriate Design Code 2020—Explanatory Memorandum—UK Government—Jun. 11, 2020.

OpenID Connect for Identity Assurance 1.0—OpenID Foundation—Oct. 1, 2024.

Laurie, Ben; Langley, Adam; Kasper, Emilia. RFC 6962: Certificate Transparency. Internet Engineering Task Force (IETF). Jun. 2013.

Verifiable Credentials Data Model v2.0—W3C Recommendation—May 15, 2025.

Verifiable Credential Data Integrity 1.0 (Securing the Integrity of Verifiable Credential Data)—W3C Recommendation—May 15, 2025.

RFC 9162: Certificate Transparency Version 2.0—IETF (RFC)—Dec. 2021.

* cited by examiner

ATTESTED CHECKOUT COMPLIANCE GATEWAY WITH PAYMENT-CREDENTIAL CONFINEMENT, TRANSACTION-SCOPED EVIDENCE BUNDLES, AND FAIL-CLOSED PURCHASE CONTROL

CROSS-REFERENCE TO RELATED APPLICATIONS

This application claims the benefit of U.S. Provisional Patent Application No. 63/869,567, filed Aug. 25, 2025.

PRELIMINARY STATEMENTS

Non-Trademark Notice. Technical labels appearing herein, including "checkout sidecar," "scope-reduction certificate," "Compliance Evidence Bundle" or "CEB," and "dispute-ready evidence view," are used for descriptive convenience, and no trademark rights are asserted by the use of such labels in this specification.

No admission. Identification of any protocol, standard, compliance objective, merchant practice, issuer practice, acquirer practice, tokenization practice, point-of-sale practice, or other external framework is illustrative and is not an admission of prior art, common general knowledge, or materiality.

No claim limitation is intended to invoke 35 U.S.C. 112(f) unless the claim language expressly recites "means for" or "step for," except as required by applicable law.

Order of precedence. If any inconsistency is perceived, the claims control, followed by the detailed description, then the drawings, and then the appendices. The appendices form part of the present disclosure and provide additional illustrative embodiments, schemas, examples, definitions, and implementation details. No appendix is required in every embodiment unless expressly recited.

Human- and agent-assisted operation. A purchase request may be initiated directly by a human user, by a wallet or merchant-side software assistant acting under authorized constraints, or by another software component operating within a permitted purchase flow. Such operational variation does not alter the payment-credential-confinement and fail-closed principles described herein.

FIELD OF THE INVENTION

The disclosed subject matter relates to secure checkout, payment-compliance enforcement, and verifiable evidence generation for payment processing and point-of-sale operations. More particularly, the disclosure concerns systems and methods that interpose a checkout-sidecar control layer in front of a merchant checkout interface, confine raw payment credentials to an attestable trusted compute boundary, generate machine-verifiable authentication evidence when step-up authentication is triggered or generate a signed policy-evaluation record when step-up authentication is not required, and emit audience-appropriate evidence products that support compliance review, scope reduction, dispute handling, and fail-closed purchase control.

BACKGROUND OF THE INVENTION

Modern checkout stacks are under simultaneous pressure to reduce raw credential exposure, satisfy strong-customer-authentication or equivalent step-up obligations, support tokenization and point-of-sale flows, and preserve enough evidentiary fidelity to handle audits, chargebacks, and fraud investigations.

Many existing architectures rely on merchant application processes, browser code, plug-ins, middleware, or generalized logging subsystems that can see, cache, or indirectly influence primary account number data, sensitive authentication data, or equivalent credential material. Even where tokenization is used, existing systems often fail to prove, on a transaction-specific basis, that raw payment credentials never traversed an untrusted merchant execution context.

Existing authentication systems may provide an approval or challenge result, but frequently do not bind machine-verifiable authentication evidence to the same canonicalized purchase context that governs authorization and credential handling. As a result, later compliance review, chargeback rebuttal, or fraud investigation can depend on fragmented records and unverifiable assertions.

Similarly, existing compliance artifacts tend to over-disclose personal data, under-disclose trust-boundary evidence, or both. Merchants, processors, issuers, gateways, auditors, and regulators can require different evidence views, yet conventional systems often lack a unified evidence object from which those views can be derived while preserving verifiability.

Emerging agent-assisted and machine-mediated commerce increases these problems because checkout events may be triggered, staged, or completed through software workflows that demand stronger proofs of credential confinement, policy-triggered authentication, and fail-closed enforcement at the point of purchase completion.

Accordingly, there remains a need for a payment-compliance gateway that: (i) keeps raw payment credentials out of a merchant application process; (ii) restricts credential unseal to a remotely attestable trusted compute boundary; (iii) binds authorization, authentication, and confinement evidence into a digitally signed evidence bundle; (iv) exports audience-specific evidence products without unnecessary disclosure; and (v) blocks purchase completion when required trust conditions are unmet.

SUMMARY OF THE INVENTION

The disclosure provides an attested checkout compliance gateway that interposes a checkout sidecar in front of a merchant checkout interface so that sensitive payment credentials are prevented from being processed by a merchant application process.

In illustrative embodiments, a payment execution enclave operates within a trusted compute boundary, such as a trusted execution environment or hardware security module. Remote attestation is verified before a payment credential is unsealed, and the payment credential is unsealed only within the trusted compute boundary.

A data-minimization policy forbids export of primary account number data and sensitive authentication data outside the trusted compute boundary. Instead, the system generates or obtains a network-routable payment instrument, such as a network token, tokenization surrogate, or payment cryptogram, suitable for downstream authorization without exposing raw credentials to the merchant application process.

Responsive to policy conditions, the system either performs strong customer authentication and collects machine-verifiable authentication evidence, or generates a signed policy-evaluation record cryptographically bound to a canonicalized purchase context and indicating that step-up authentication was not required for the purchase. In some embodiments, the authentication evidence includes a result code and a cryptographic verifier output or signature bound to a canonical authentication transcript and, in some embodiments, to a three-domain secure transaction identifier.

The system constructs a digitally signed Compliance Evidence Bundle (CEB) that binds an attestation measurement, a data-flow confinement digest, an authorization trace digest, and either the machine-verifiable authentication evidence or the signed policy-evaluation record. In some embodiments, the CEB is signed over a signature scope that includes at least a transaction identifier or nonce, the attestation measurement, the data-flow confinement digest, and the authorization trace digest, and may further include a canonicalized purchase-context digest, a freshness value, an export-profile digest, or a digest of the authentication evidence or signed policy-evaluation record.

Illustrative evidence products include an auditor-mode CEB, a selective-disclosure CEB view, a scope-reduction certificate, and a dispute-ready evidence view. In some embodiments, the scope-reduction certificate comprises a signed assertion generated based at least on the attestation measurement, the data-flow confinement digest, and measured confinement inputs including a measured egress policy digest, a process-boundary classification digest, or a memory-access audit digest, so that different audiences can validate trust-boundary and credential-exclusion results without unnecessary disclosure of personal data or raw credentials.

The gateway asserts fail-closed behavior and blocks purchase completion, settlement submission, or both if remote attestation fails, if the data-minimization policy is violated, if required authentication evidence is invalid or missing, or if step-up authentication is not required and the signed policy-evaluation record is invalid or missing. Machine-readable failure records can be emitted for later investigation without exposing raw payment credentials.

In additional embodiments, the gateway supports point-of-sale operation, secure-element-generated EMV authorization cryptograms, offline caching of auditor-mode evidence products subject to bounded validity, offline reconciliation state transitions including OFFLINE_BUFFERING, RECONNECT_PENDING, STALE, REQUIRE_STEP_UP_ON_RECONNECT, HOLD_CAPTURE, and HOLD_SETTLEMENT states, optional append-only audit stores, selective-disclosure proofs including zero-knowledge predicates, and compliance control mappings that relate evidence fields to control objectives of payment security standards or authentication-compliance regimes.

The disclosed architecture is compatible with human-driven checkout flows, wallet-mediated flows, gateway-hosted deployments, processor-hosted deployments, merchant-hosted deployments, and authorized software-agent purchase flows, while preserving the central principle that raw payment credentials remain confined to an attestable trusted compute boundary and that the resulting evidence substrate indicates either that step-up authentication was performed or that a signed policy-evaluation record established that step-up authentication was not required.

In optional embodiments, the gateway additionally supports subscription, renewal, and split-tender variants in which renewal periods are re-attested and re-evaluated, baseline expectation digests and material-variance rules are applied across billing periods, parent evidence references are chained across billing periods, partition-specific policy predicates are evaluated per tender leg, and leg-specific deny, freeze, clawback, refund, reversal, or dispute-package actions are recorded without changing the checkout-sidecar and trusted-boundary core. Optional deployment profiles further support agent-mediated checkout subject to authority manifests, human-confirmation digests, category guards, spend caps, audience-specific dispute and representment evidence packages, and transport-binding and token-lifecycle controls that preserve measurement continuity across session establishment, resumption, token issuance, token refresh, revocation, rotation, supersession, and verifier-specific export policy.

DETAILED DESCRIPTION OF THE INVENTION (WITH REFERENCE NUMERALS)

A. Definitions and Terminology

Figure 1:
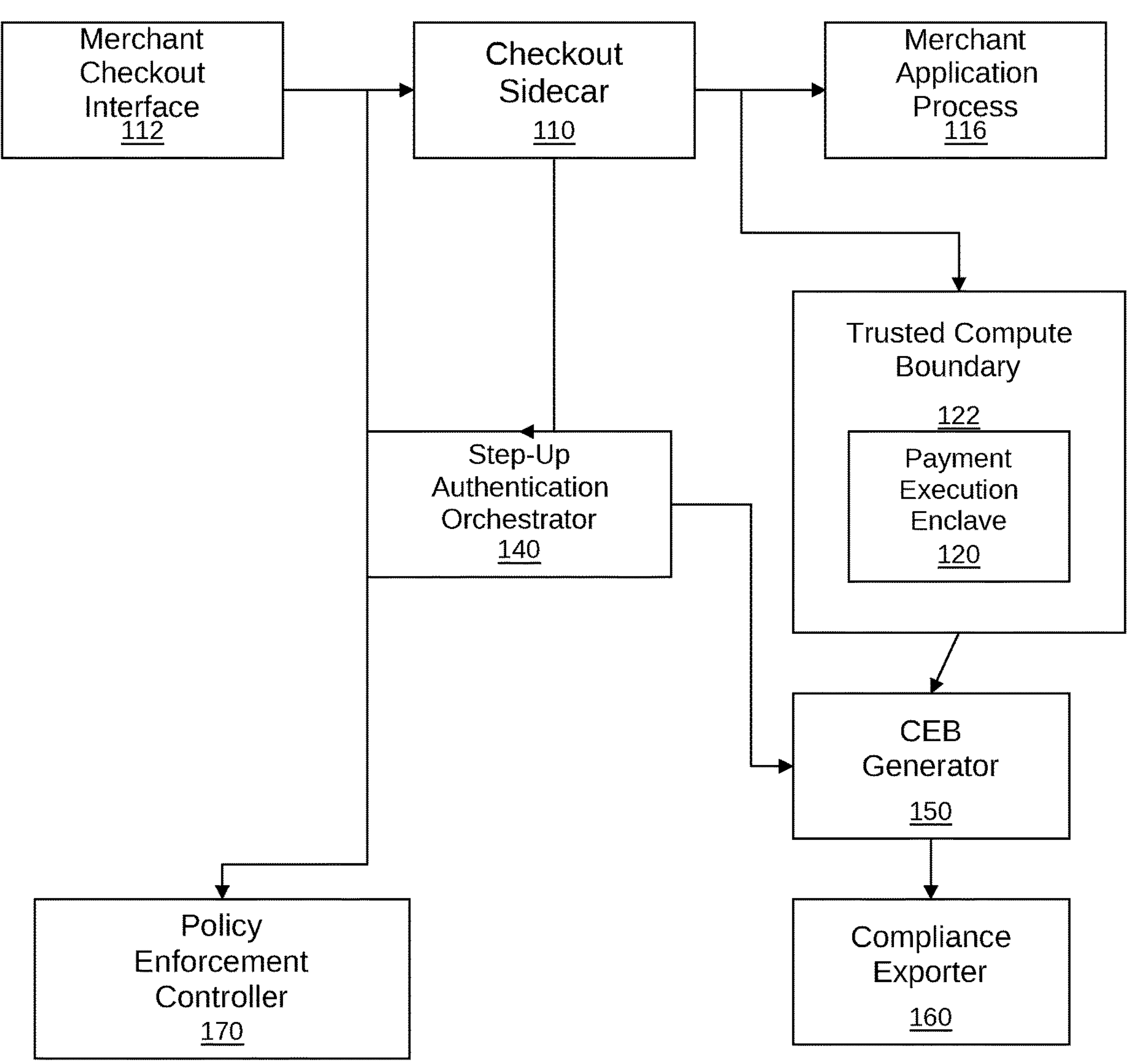
FIG. 1 is a block diagram of an attested checkout compliance gateway including a checkout sidecar, a payment execution enclave within a trusted compute boundary, a step-up authentication orchestrator, a Compliance Evidence Bundle generator, a compliance exporter, and a fail-closed policy enforcement controller.

As used herein, "sensitive payment credentials" include, without limitation: (i) primary account number (PAN) data, (ii) sensitive authentication data (SAD), including card verification values, track data, or equivalent secrets, and (iii) credential material from which such secrets can be directly reconstructed.

A "trusted compute boundary" means an execution boundary whose integrity can be established through remote attestation, hardware-rooted protection, or equivalent measurement-based verification. Illustrative trusted compute boundaries include a trusted execution environment (TEE), a hardware security module (HSM), or a trusted combination thereof.

"Machine-verifiable authentication evidence" means evidence sufficient for an independent verifier to validate that a required authentication event occurred, including at least a result code and one or more cryptographic verifier outputs, signatures, or equivalent proof artifacts bound to a canonical transaction representation.

"Canonicalized purchase context" means a deterministic representation of purchase-related inputs and outcomes sufficient to bind authorization and authentication evidence to the relevant purchase while intentionally excluding raw PAN and SAD values.

"Compliance Evidence Bundle" or "CEB" means a digitally signed evidence object that binds trust-boundary evidence, credential-confinement evidence, authorization evidence, and, where applicable, authentication evidence or a signed policy-evaluation record indicating that step-up authentication was not required, such that multiple audience-specific evidence products can be derived without losing verifiability.

"Signed policy-evaluation record" means a machine-verifiable signed record indicating that, for a particular purchase, step-up authentication was evaluated under an applicable policy profile and determined to be not required, the record being cryptographically bound to at least a canonicalized purchase context and a transaction identifier or nonce.

"Signature scope" means a deterministic set of values covered by a digital signature for a CEB or related evidence object. Illustrative signature-scope values include a transaction identifier or nonce, an attestation measurement, a data-flow confinement digest, an authorization trace digest, a canonicalized purchase-context digest, a freshness value, an export-profile digest, and a digest of authentication evidence or of a signed policy-evaluation record.

"Scope-reduction proof basis" means a set of measured evidence inputs from which a scope-reduction certificate or related signed assertion is generated, the measured evidence inputs including, by way of illustration, an attestation measurement, a data-flow confinement digest, a measured egress policy digest, a process-boundary classification digest, a memory-access audit digest, a telemetry-sanitization digest, a zeroization-event digest, or tokenization-event provenance.

"Measurement continuity digest" means a digest or equivalent verifier-usable value that links an attestation measurement, a transport or session continuity state, and one or more token-lifecycle states so that later verifiers can determine whether a resumed, refreshed, reissued, rotated, or superseded artifact remained within an authorized continuity envelope.

B. System Architecture Overview (FIG. 1)

Referring to FIG. 1, an illustrative system 100 includes a checkout sidecar 110 deployed in front of a merchant checkout interface 112. The checkout sidecar 110 receives or intercepts a purchase request 114 before protected credential fields can be processed by a merchant application process 116.

The system 100 further includes a payment execution enclave 120 operating within a trusted compute boundary 122. The trusted compute boundary 122 is coupled to an attestation verifier 124, a credential unseal module 126, and a confinement controller 128. The payment execution enclave 120 cooperates with a payment instrument generator 130 to derive or obtain a network-routable payment instrument suitable for authorization without exposing raw payment credentials to the merchant application process 116.

The system 100 also includes a step-up authentication orchestrator 140, an authentication evidence collector 144, a canonical transcript builder 146, a CEB generator 150, a signature module 154, a compliance exporter 160, and a policy enforcement controller 170. In some embodiments, the system further communicates with a token service provider interface 180, a payment-processor or acquirer interface 182, and a point-of-sale device 190 having a secure element 192.

In operation, the checkout sidecar 110, payment execution enclave 120, and policy enforcement controller 170 cooperate so that raw payment credentials remain confined to the trusted compute boundary 122, while downstream authorization, compliance, and dispute functions operate on derived instruments and evidence objects rather than on raw PAN or SAD values.

C. Checkout Sidecar and Credential Exclusion (FIG. 2)

Figure 2:
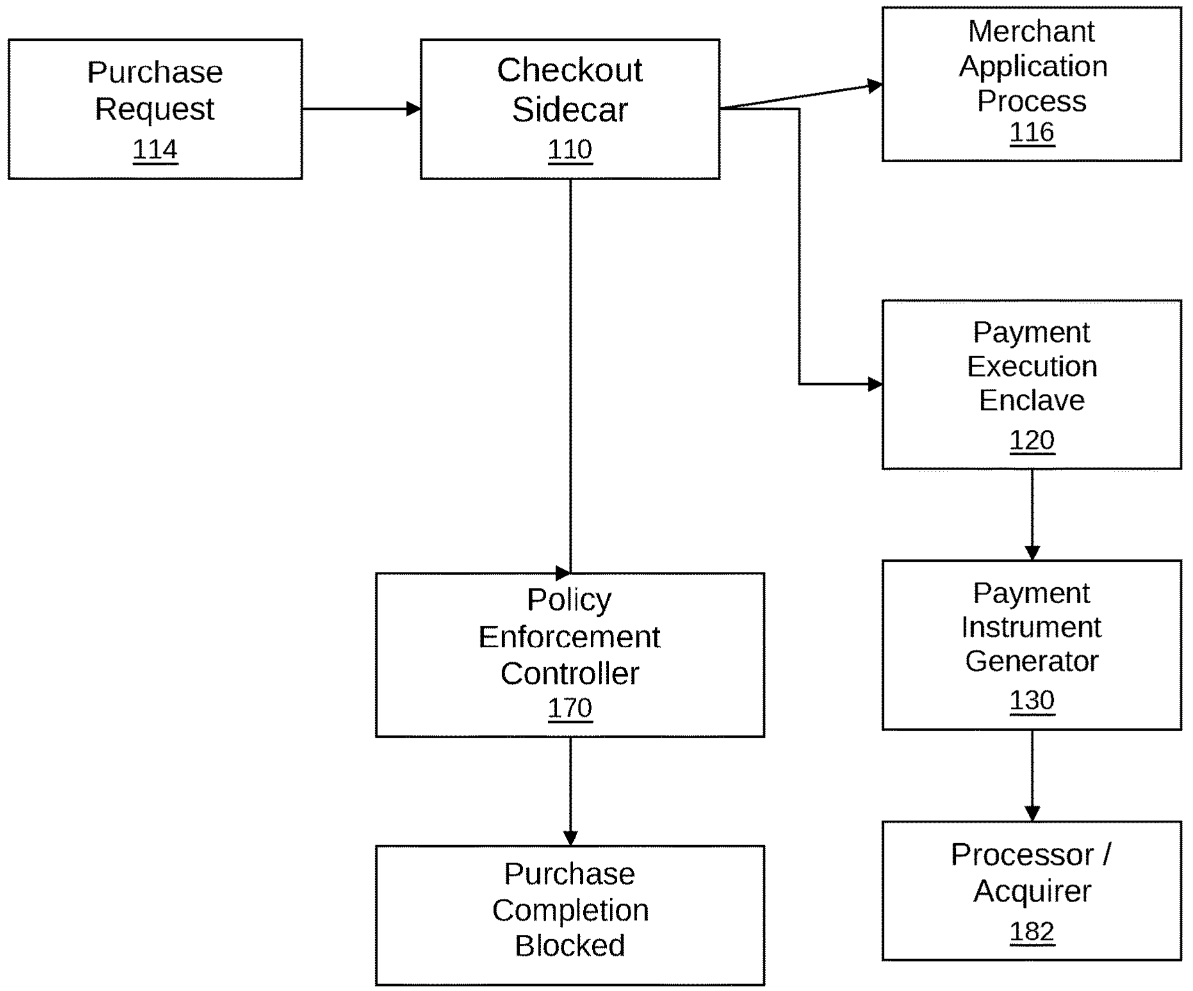
FIG. 2 is a flow-oriented diagram showing checkout-sidecar interception, credential exclusion from a merchant application process, tokenization-surrogate forwarding, and fail-closed blocking when protected-field handling conditions are not met.

Referring to FIG. 2, the checkout sidecar 110 is configured to intercept purchase requests and to prevent sensitive payment credentials from being processed by the merchant application process 116. In some embodiments, the checkout sidecar 110 terminates mutually authenticated transport 118 and applies field-level classification rules before a request is forwarded downstream.

Illustrative exclusion actions include: removing protected credential fields from the request body, replacing a credential field with a tokenization surrogate, denying forwarding of a request that contains protected fields, or redirecting protected-field handling to the payment execution enclave 120. In some embodiments, the checkout sidecar 110 enforces an allow-list of egress endpoints approved for payment-related communication.

The merchant application process 116 may continue to perform business-logic operations using non-sensitive purchase-context fields, while protected-field operations are withheld from that process. As a result, the merchant application process 116 may be excluded from handling raw PAN or SAD values even where it participates in order construction, tax calculation, fulfillment, or fraud-screening workflows.

If the checkout sidecar 110 detects a forwarding attempt, logging attempt, cache write, or inter-process disclosure that would violate the credential-exclusion policy, the policy enforcement controller 170 may assert fail-closed behavior, block purchase completion, and emit a machine-readable failure record rather than allowing a best-effort continuation.

D. Trusted Compute Boundary, Remote Attestation, and Guarded Unseal (FIG. 3)

Figure 3:
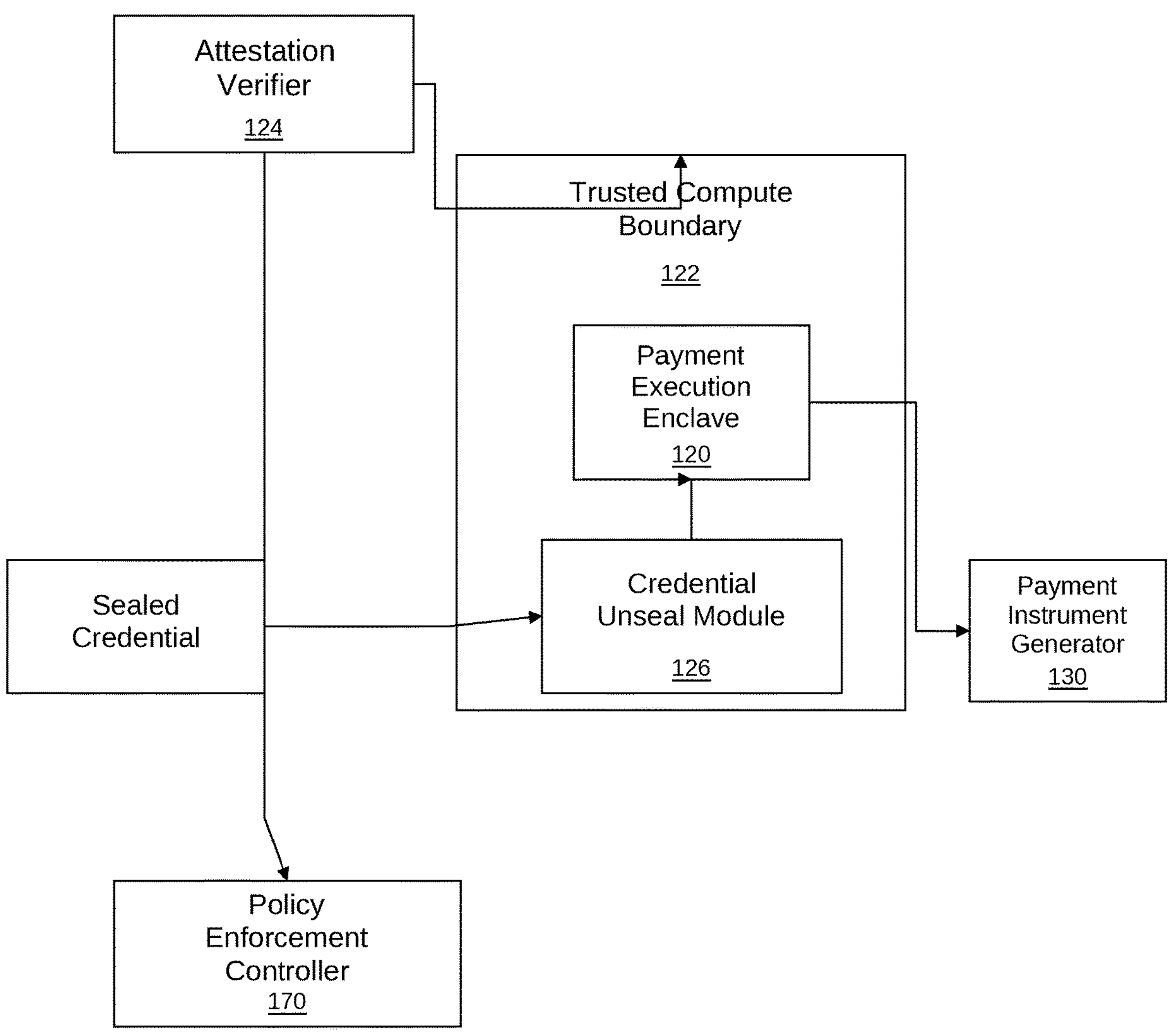
FIG. 3 is a diagram showing remote attestation verification, guarded credential unseal, and binding of unsealed credential use to a verified trusted compute boundary.

Referring to FIG. 3, the payment execution enclave 120 operates inside the trusted compute boundary 122. Prior to unsealing a payment credential, the attestation verifier 124 validates remote attestation of the trusted compute boundary 122.

In illustrative embodiments, remote attestation verification comprises: verifying an endorsement chain for an attestation key, checking revocation status, and comparing a reported measurement to an expected measurement referenced by a policy manifest, version manifest, or equivalent trust-policy object.

Upon successful remote attestation verification, the credential unseal module 126 unseals the payment credential only within the trusted compute boundary 122. In the event of attestation failure, mismatch, or revocation, unseal is denied and the policy enforcement controller 170 fail-closes the purchase flow.

In some embodiments, unsealed credentials are sealed to the boundary measurement and optional key identifiers so that a different measurement cannot unseal or reuse the credential. In some embodiments, the HSM serves as the trusted compute boundary or as a root key provider, such that PAN and SAD never exist outside the HSM boundary in plaintext.

E. Data Minimization and Confinement Digest (FIG. 4)

Figure 4:
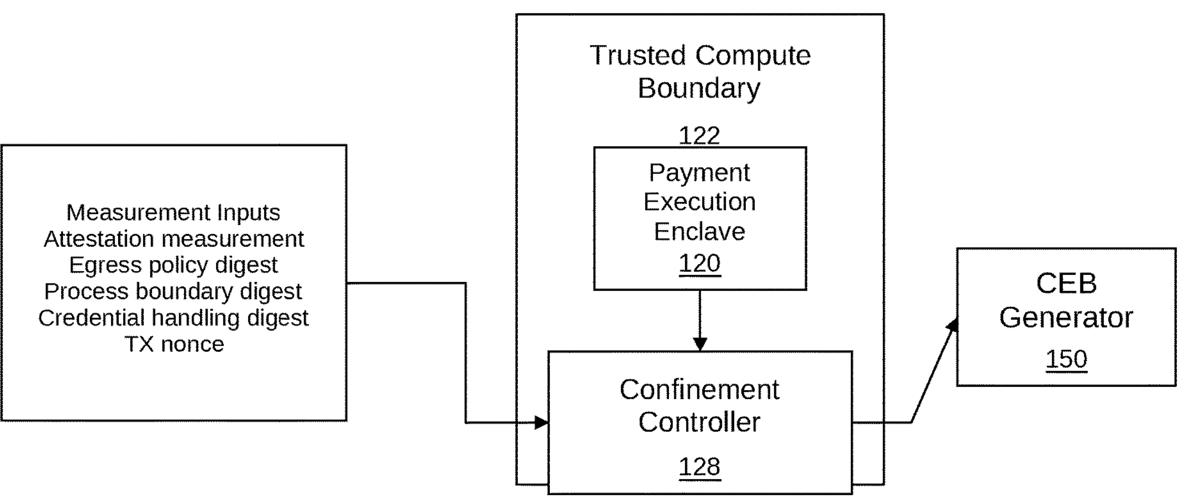
FIG. 4 is a diagram showing data-minimization enforcement and construction of a data-flow confinement digest from trust-boundary and credential-handling measurements.

Referring to FIG. 4, the system enforces a data-minimization policy that forbids export of PAN data and SAD outside the trusted compute boundary 122. The confinement controller 128 may restrict egress endpoints, inter-process communication paths, memory export, clipboard transfer, logging behavior, and any other channel through which protected credential material might escape the trusted compute boundary.

For each purchase or for each protected credential-handling event, the system may construct a data-flow confinement digest that attests that the payment credential remained confined to the trusted compute boundary 122 for the relevant transaction. In some embodiments, the data-flow confinement digest is computed from at least a measured egress policy digest and a process-boundary classification digest identifying processes authorized to access the payment credential, and may be further computed from a memory-access audit digest generated within the trusted compute boundary.

An illustrative confinement-digest computation may be represented as confinement_digest=H(attestation_measurement||measured_egress_policy_digest||process_boundary_classification_digest||memory_access_audit_digest||tx_nonce), where H is a cryptographic hash function and tx_nonce is a per-transaction nonce or equivalent freshness input. In some embodiments, the memory_access_audit_digest includes or is derived from a credential_handling_digest reflecting protected operations within the trusted compute boundary.

In some embodiments, the credential_handling_digest reflects one or more of: secure-element cryptogram generation events, tokenization events, zeroization confirmations, sealed key access events, or other protected operations recorded in a measurement-aware manner. The resulting confinement digest is included in the CEB and signed by a key protected by the trusted compute boundary 122.

F. Network-Routable Payment Instrument and Authorization Trace Digest

The payment instrument generator 130 generates or obtains a network-routable payment instrument derived from the payment credential while preserving the data-minimization policy. Illustrative network-routable payment instruments include a network token, a tokenization surrogate, or a payment cryptogram generated within the trusted compute boundary 122 or secure element 192.

In some embodiments, the payment instrument generator 130 communicates with a token service provider via the TSP interface 180 or with a processor or acquirer via the interface 182. The derived instrument, tokenization outcome, or authorization artifact is bound into an authorization trace digest.

The authorization trace digest binds an authorization outcome, such as approved, declined, challenge-completed, risk-evaluated, or equivalent outcome data, to the canonicalized purchase context. In illustrative embodiments, the canonicalized purchase context includes an order identifier, merchant identifier, amount, currency, bounded item descriptors, and optional wallet or device identifiers, while excluding PAN and SAD by design.

By binding authorization outcomes to a canonicalized purchase context that excludes raw credentials, the disclosed architecture supports downstream auditability and dispute handling without reintroducing protected credential material into the merchant application process 116 or downstream evidence products.

G. Policy-Triggered Step-Up Authentication and Evidence (FIG. 5)

Figure 5:
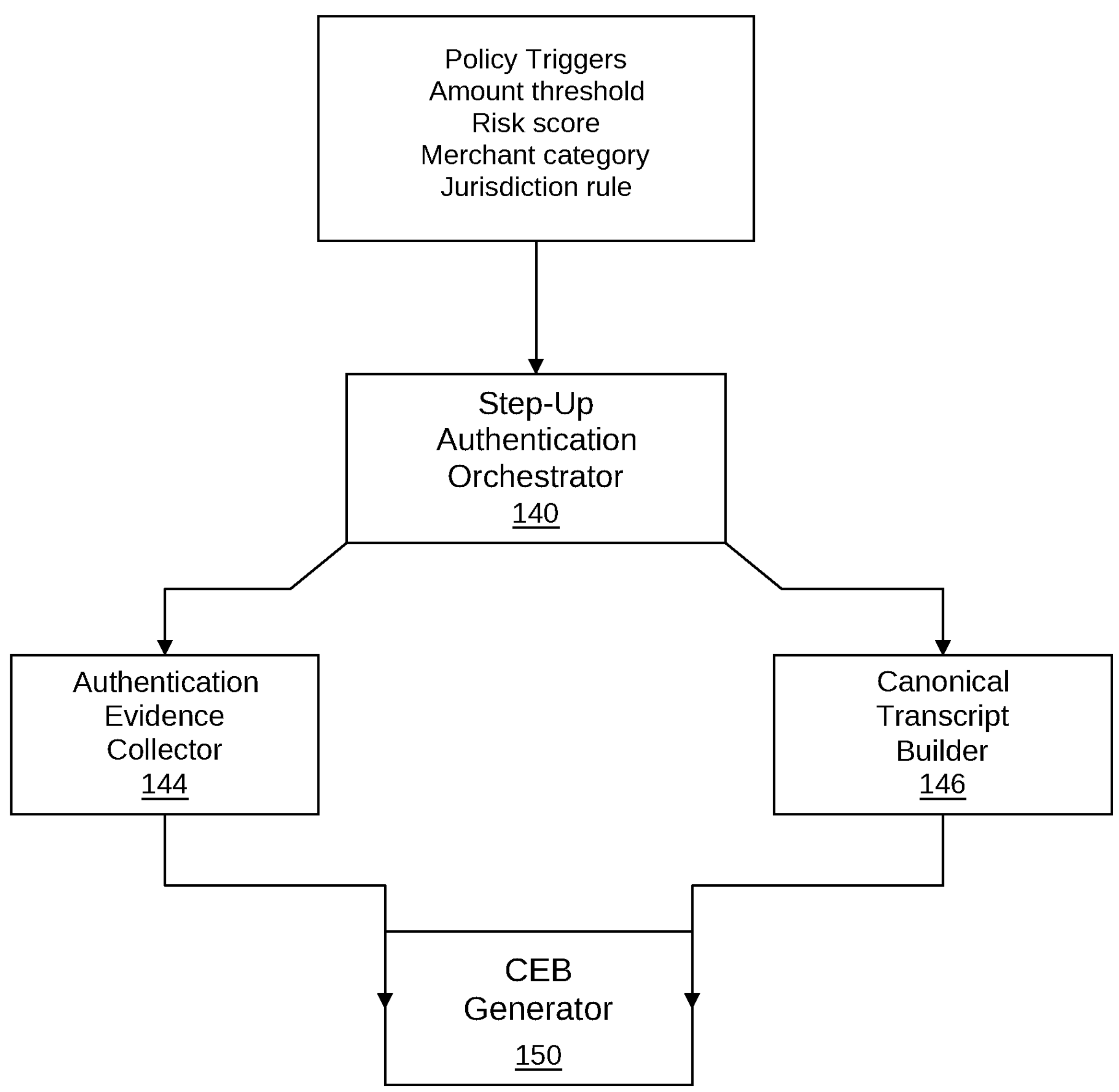
FIG. 5 is a diagram showing policy-triggered step-up authentication and collection of machine-verifiable authentication evidence.

Referring to FIG. 5, the step-up authentication orchestrator 140 performs strong customer authentication responsive to a policy condition. Illustrative policy conditions include amount thresholds, risk scores, merchant categories, jurisdiction rules, device-posture conditions, repeat-attempt counts, anomaly-detection signals, or combinations thereof.

When step-up authentication is required or performed, the authentication evidence collector 144 obtains machine-verifiable authentication evidence comprising at least: an authentication result code and a cryptographic verifier output or signature bound to a canonical representation of an authentication transcript. In some embodiments, the canonical transcript builder 146 forms a deterministic representation of authentication inputs and outcomes sufficient for independent verification while excluding unnecessary personal data.

When policy evaluation determines that step-up authentication is not required for a purchase, the step-up authentication orchestrator 140 may generate or obtain a signed policy-evaluation record that identifies a policy profile or policy digest, a trigger result or not-required indicator, and a transaction identifier or nonce, and that is cryptographically bound to a canonicalized purchase context. In some embodiments, the signed policy-evaluation record also includes a reason code, freshness value, or export-profile identifier sufficient for later verifier review.

In illustrative three-domain secure (3DS) embodiments, the machine-verifiable authentication evidence includes at least one of: an issuer-signed result, a directory-server signed result, and an access-control-server signed result bound to a 3DS transaction identifier. Other strong-authentication protocols and verifier formats may be used in addition to or instead of 3DS.

In some embodiments, the authentication evidence is further bound to the canonicalized purchase context through an authentication-to-purchase binding digest so that later verifiers can confirm that the recorded step-up event corresponds to the same purchase for which authorization and confinement evidence were generated. In some embodiments, the signed policy-evaluation record is similarly bound to the canonicalized purchase context so that later verifiers can confirm that the no-step-up path corresponds to the same purchase for which authorization and confinement evidence were generated.

The signed policy-evaluation record may be generated within the trusted compute boundary 122, by a signing component logically associated with the trusted compute boundary 122, or by another trusted policy-evaluation service whose result is cryptographically bound into the transaction-scoped evidence substrate. In some embodiments, the signed policy-evaluation record is embedded in, or referenced by, the CEB.

H. Compliance Evidence Bundle (CEB) and Export Views (FIG. 6)

Figure 6:
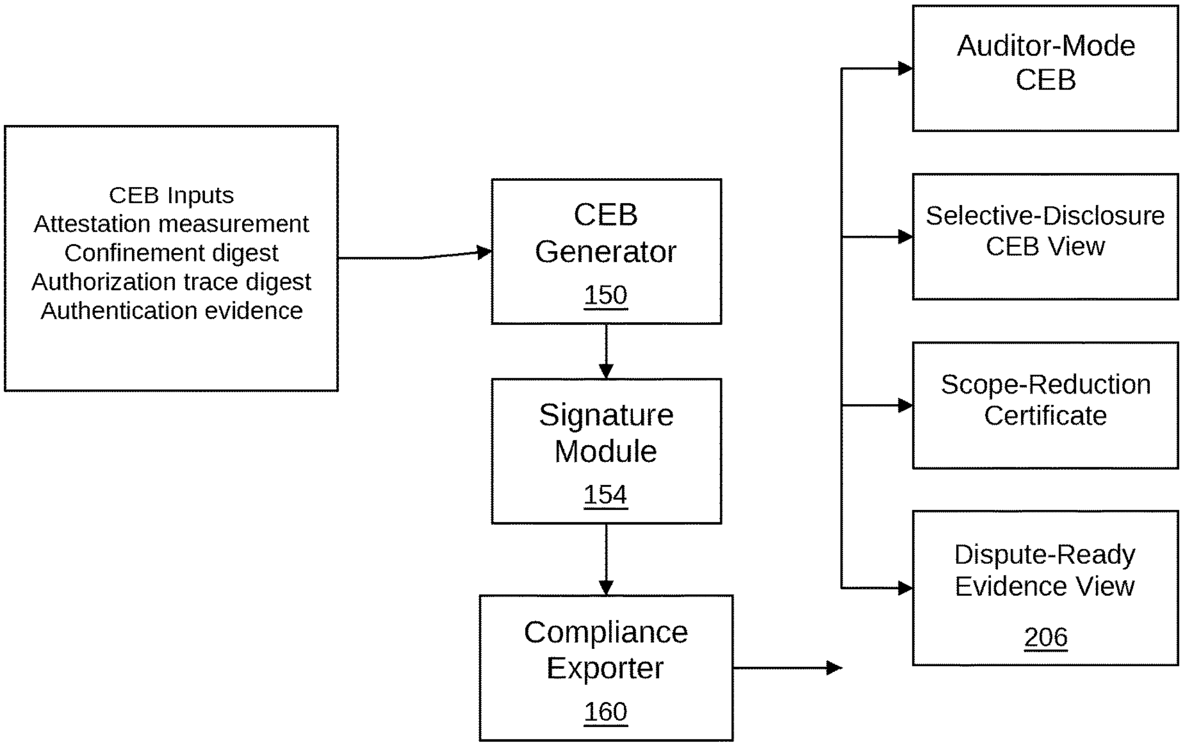
FIG. 6 is a diagram showing construction of a digitally signed Compliance Evidence Bundle and derivation of multiple audience-specific evidence products.

Referring to FIG. 6, the CEB generator 150 constructs a Compliance Evidence Bundle comprising at least: an attestation measurement associated with the trusted compute boundary used for the purchase; a confinement digest attesting that the payment credential remained confined to the trusted compute boundary; an authorization trace digest binding an authorization outcome to a canonicalized purchase context; and either machine-verifiable authentication evidence when step-up authentication is required or performed, or a signed policy-evaluation record when step-up authentication is not required.

The signature module 154 digitally signs the CEB using a key protected by the trusted compute boundary 122. In some embodiments, the signature is applied over a signature scope that includes at least a transaction identifier or nonce, the attestation measurement, the confinement digest, and the authorization trace digest, and may further include a canonicalized purchase-context digest, a freshness value, an export-profile digest, and a digest of authentication evidence or of a signed policy-evaluation record. Optional multiple signatures, staged cutover policies, or post-quantum signatures may be used without departing from the disclosure.

The compliance exporter 160 outputs multiple evidence products from the CEB. An auditor-mode CEB may preserve a rich evidence set for compliance review. A selective-disclosure CEB view may redact personal data while preserving verifiability of at least the attestation measurement, confinement digest, authorization trace digest, and relevant authentication evidence or signed policy-evaluation record. A dispute-ready evidence view 206 may emphasize authorization evidence together with machine-verifiable authentication evidence when step-up authentication was performed or a signed policy-evaluation record when step-up authentication was not required.

In some embodiments, the compliance exporter 160 outputs a scope-reduction certificate comprising a signed assertion that the merchant application process 116 did not store, process, or transmit PAN data and that sensitive authentication data was not exported to the merchant application process 116. In illustrative embodiments, the signed assertion is generated based at least on the attestation measurement, the confinement digest, and measured evidence inputs including a measured egress policy digest, a process-boundary classification digest, or a memory-access audit digest generated within the trusted compute boundary 122. The scope-reduction certificate may further include separate non-storage, non-processing, non-transmission, non-export, telemetry-sanitization, zeroization, or tokenization-provenance assertions. In some embodiments, the CEB additionally includes a compliance control mapping that maps CEB fields to control identifiers for a payment security standard or authentication-compliance regime.

In some embodiments, the scope-reduction certificate includes verifiable references to the attestation measurement, the confinement digest, one or more measured egress-policy or process-boundary values, and, where available, a memory-access audit digest, telemetry-sanitization digest, zeroization-event digest, or tokenization-event provenance digest so that different verifier classes may validate the evidentiary basis of the certificate according to profile-specific disclosure policy.

Figure 9:
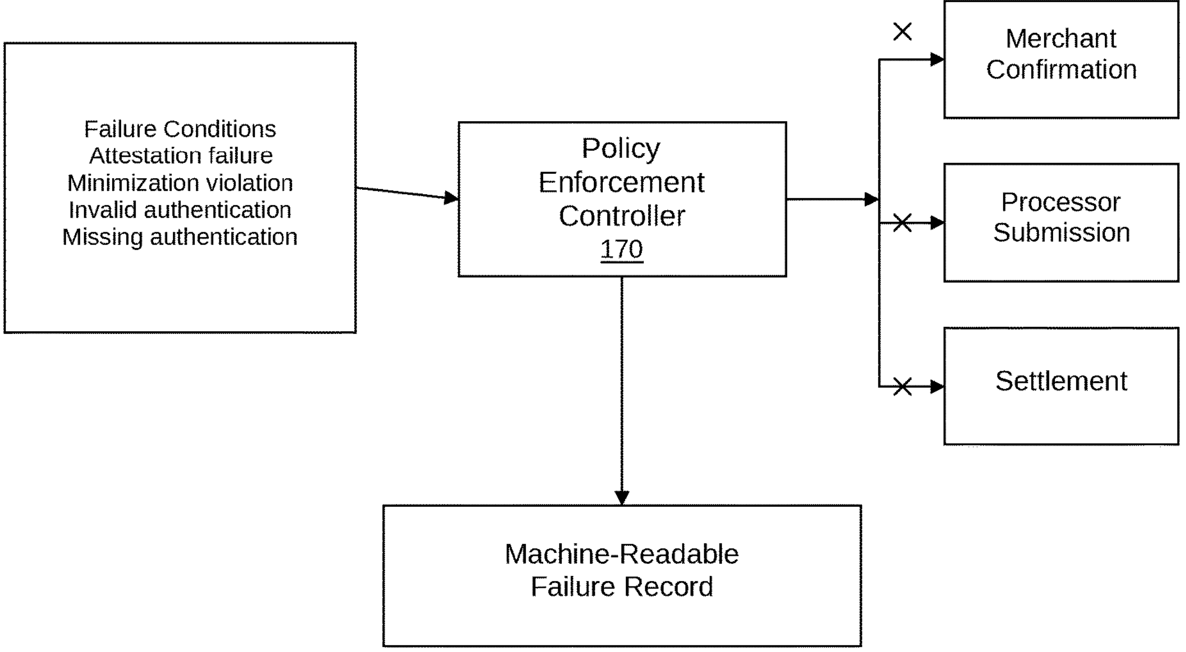
FIG. 9 is a diagram showing fail-closed blocking and issuance of machine-readable failure records.

I. Fail-Closed Enforcement and Failure Records (FIGS. 2 and 9)

The policy enforcement controller 170 asserts fail-closed behavior and blocks completion of the purchase, settlement submission, merchant confirmation, or any combination thereof when remote attestation fails, when the data-minimization policy is violated, when required authentication evidence is absent or invalid, or when step-up authentication is not required and the signed policy-evaluation record is absent or invalid.

In illustrative embodiments, asserting fail-closed behavior includes emitting a machine-readable failure record including a failure code selected from attestation failure, minimization_violation, authentication_evidence_invalid, authentication_evidence_missing, policy_evaluation_record_invalid, policy_evaluation_record_missing, policy_mismatch, measurement_revoked, transport_binding_failure, measurement_continuity_failure, signature_scope_mismatch, or stale_offline evidence.

Failure records may include a non-sensitive transaction reference, time value, selected digests, remediation hints, or operator-routing metadata sufficient for later investigation without exposing PAN or SAD. In some embodiments, the failure record is stored locally, transmitted to a compliance service, or both.

J. POS Embodiments, Secure Element Cryptograms, and Offline Mode (FIG. 7)

Figure 7:
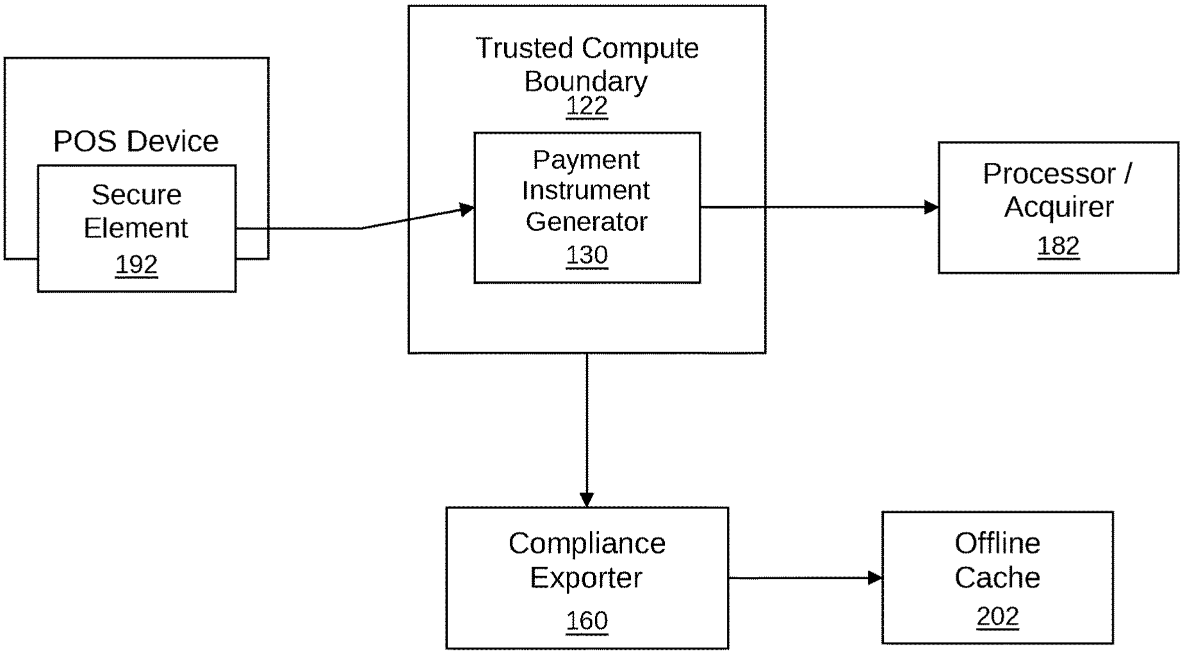
FIG. 7 is a diagram showing point-of-sale embodiments, secure-element cryptogram generation, and offline caching of auditor-mode evidence products.

Referring to FIG. 7, in point-of-sale embodiments the system includes a POS device 190 having a secure element 192. The secure element 192 may generate an EMV authorization cryptogram or equivalent payment cryptogram usable as the network-routable payment instrument or as a bound component of that instrument.

In some embodiments, the authorization trace digest binds the EMV authorization cryptogram to the canonicalized purchase context, thereby preserving transaction-specific linkage between secure-element output and purchase-specific authorization evidence.

The compliance exporter 160 may support an offline mode in which an auditor-mode CEB is cached locally in an offline cache 202 and later exported upon reconnection. The cached evidence may include an offline indicator, bounded validity window, local freshness marker, or equivalent staleness metadata.

In some embodiments, offline constraints cause the system to require step-up authentication upon reconnection, to mark evidence as stale if the bounded validity window is exceeded, or to block purchase completion when an offline risk threshold is exceeded.

In some embodiments, offline processing is governed by a reconciliation state machine including one or more of OFFLINE_BUFFERING, RECONNECT_PENDING, STALE, REQUIRE_STEP_UP_ON_RECONNECT, HOLD_CAPTURE, and HOLD SETTLEMENT states. State transitions may depend on a bounded offline-validity window, a floor-limit policy, an offline-risk class, a device-time-drift threshold, or a resumption-counter threshold.

During offline reconciliation, the system may compute a measurement continuity digest linking a prior attestation measurement, a local freshness value, a transport or session continuity value, and one or more token-lifecycle states so that later verifiers can distinguish valid offline-to-online reconciliation from stale, superseded, or policy-incompatible continuity conditions.

K. Optional Append-Only Compliance Audit Store (FIG. 8)

Figure 8:
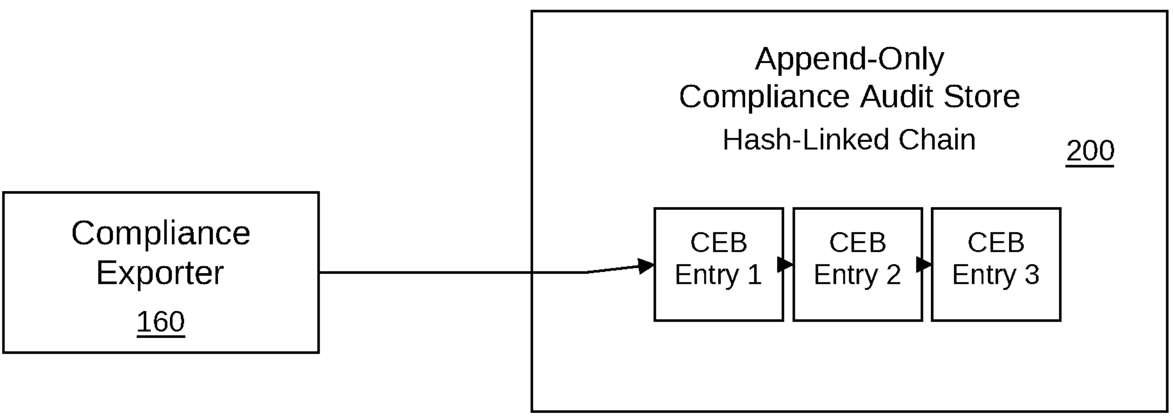
FIG. 8 is a diagram showing an optional append-only compliance audit store that preserves a hash-linked chain of evidence entries.

Referring to FIG. 8, the system may write auditor-mode CEB entries to an append-only compliance audit store 200 that maintains a hash-linked chain of evidence entries. The append-only compliance audit store 200 may be local, remote, federated, or distributed across multiple administrative domains.

In some embodiments, the append-only compliance audit store 200 is not required for completion of the purchase. Rather, the store provides an optional durable audit trail or evidence-preservation layer that can be used for post-transaction compliance review, dispute analysis, or regulatory production.

L. Selective Disclosure, Zero-Knowledge Predicates, and Audience Partitioning (FIG. 10)

Figure 10:
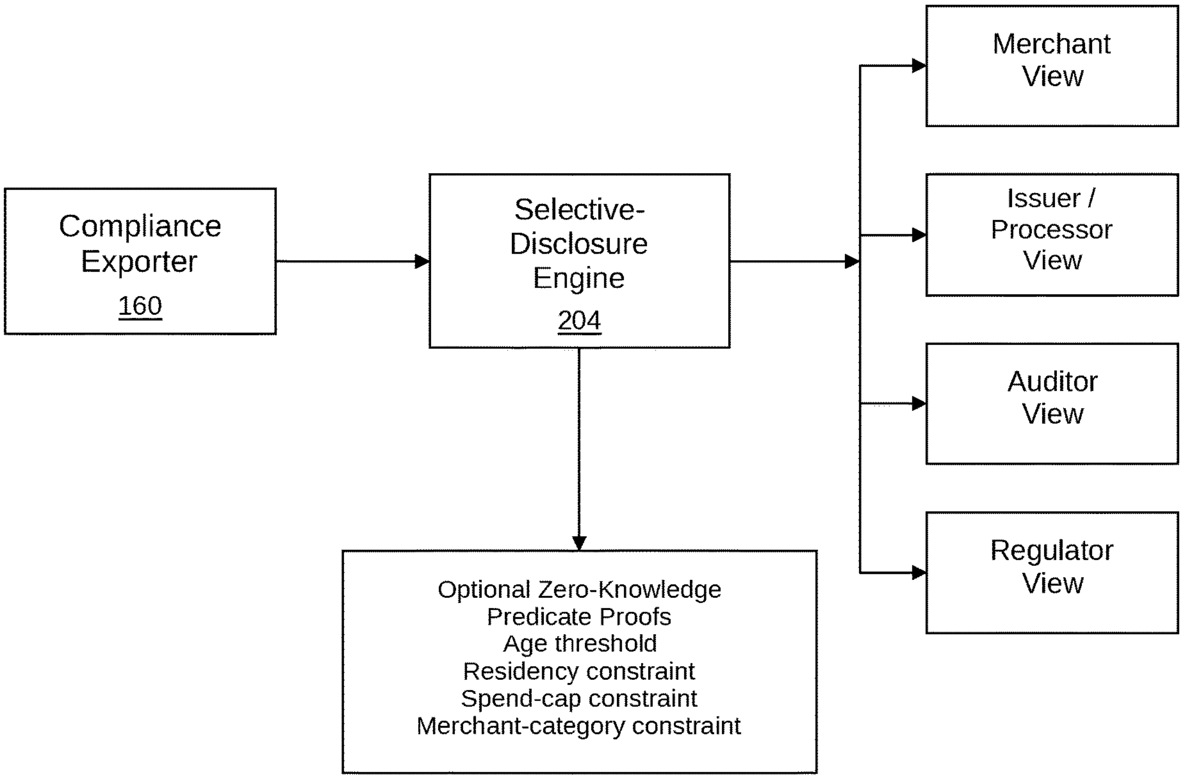
FIG. 10 is a diagram showing selective-disclosure export and optional zero-knowledge proofs for regulated predicates.

Referring to FIG. 10, a selective-disclosure engine 204 may derive audience-specific views from the CEB. In some embodiments, a selective-disclosure CEB view includes a zero-knowledge proof attesting satisfaction of at least one policy predicate selected from an age threshold, a residency constraint, a spend-cap constraint, and a merchant-category constraint, without revealing underlying raw values.

In some embodiments, the zero-knowledge proof is bound to the canonicalized purchase context, the attestation measurement, or both, so that a verifier can validate predicate compliance for the relevant purchase without gaining access to the underlying raw personal data.

Audience partitioning may be implemented by policy so that a merchant receives one view, an issuer or processor receives a different view, an auditor receives a richer auditor-mode view, and a regulator receives a regulated selective-disclosure view, each preserving verifiability appropriate to the audience.

Figure 11:
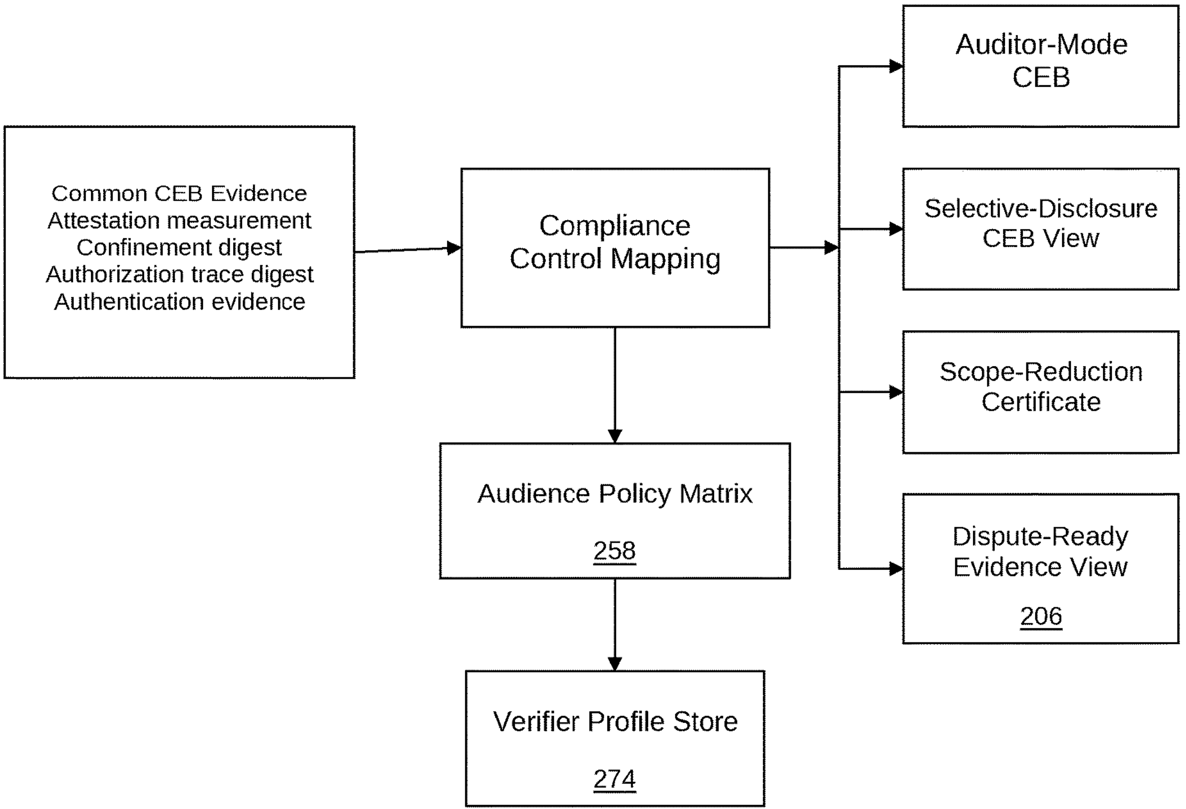
FIG. 11 is a diagram showing compliance control mapping and an evidence-product matrix aligned to audience-specific disclosure policies.

M. Compliance Control Mapping and Evidence Products (FIG. 11)

In some embodiments, the CEB includes a compliance control mapping that maps CEB fields to control objectives or control identifiers of one or more payment security standards, authentication-compliance regimes, contractual evidence requirements, or enterprise control frameworks. The mapping may be stored inside the CEB, in a sidecar metadata object, or in an associated export profile.

Illustrative evidence products include: (i) an auditor-mode CEB emphasizing trust-boundary evidence and full transaction linkage; (ii) a selective-disclosure CEB view emphasizing privacy-preserving verifiability; (iii) a scope-reduction certificate emphasizing exclusion of raw credentials from a merchant application process; and (iv) a dispute-ready evidence view emphasizing authorization evidence together with machine-verifiable authentication evidence when step-up authentication was performed or a signed policy-evaluation record when step-up authentication was not required, useful in chargeback rebuttal and fraud investigation.

Because these evidence products are derived from a common CEB, the disclosed architecture reduces inconsistencies across audiences and enables a merchant, processor, issuer, auditor, or regulator to validate relevant evidence without requiring raw PAN or SAD disclosure.

N. Deployment Topologies and Technical Effects

In some embodiments, the checkout sidecar 110 is deployed as an API-gateway plug-in, service-mesh sidecar, container adjacent to the merchant application process 116, hardware appliance, wallet-side execution layer, processor-hosted service, or combinations thereof.

Illustrative technical effects include one or more of: reduction of credential-exposure scope; transaction-specific proof of credential confinement; transaction-specific proof of machine-verifiable step-up authentication when performed; transaction-specific proof, via a signed policy-evaluation record, that step-up authentication was not required when not performed; audience-specific evidence exports with reduced personal-data disclosure; stronger chargeback-rebuttal and fraud-investigation evidentiary posture; and fail-closed purchase blocking when required trust conditions are not met.

The disclosed gateway is especially useful in environments where a merchant seeks to keep protected credentials outside the merchant application process 116, where a processor or issuer demands verifiable step-up evidence, where point-of-sale and online checkout flows share evidence requirements, or where machine-mediated and agent-assisted purchase flows require stronger evidence of policy-constrained execution.

O. Subscription, Renewal, and Partitioned Consideration Variants

In further embodiments, the system may additionally implement one or more renewal-evaluation, subscription-cadence, partitioned-consideration, leg-specific settlement-control, and renewal-evidence-linking functions. These functions may cooperate with the checkout sidecar 110, the payment execution enclave 120, and the CEB generator 150 so that recurring purchases, usage-based charges, scheduled renewals, and split-tender payments remain anchored to the same credential-confinement, attestation, and evidence-generation architecture.

In illustrative subscription and renewal embodiments, each billing cycle, renewal cycle, or recurring charge event may be re-attested and re-evaluated. The renewal evaluator 242 may require renewed validation of trust-boundary integrity, applicable policy, freshness, consent horizon, a baseline expectation digest, a material-variance rule, and any required human confirmation before a recurring charge is completed. A renewal CEB may include a parent transaction reference, parent CEB reference, renewal-period identifier, cadence value, grace indicator, proration basis, or equivalent continuity fields linking a later cycle to one or more prior cycles while still preserving fail-closed behavior when required conditions are not met.

In some embodiments, the baseline expectation digest reflects one or more expected merchant, amount, category, destination, renewal cadence, service period, or benefit-consumption values, and a material-variance rule determines whether deviation from that baseline requires renewed step-up authentication, renewed human confirmation, renewed policy evaluation, or a fail-closed halt.

In split-tender embodiments, the partitioned consideration engine 246 may represent consideration as a partitioned consideration vector in which distinct tender legs correspond to different instruments, payment networks, issuers, funding sources, benefit classes, stored-value balances, or regulatory categories. Policy predicates may be evaluated per leg, and the leg-specific settlement controller 248 may permit approval of one leg while denying, freezing, reversing, refunding, clawing back, or packaging a leg-specific dispute view for another leg according to leg-specific policy results, thereby enabling partition-specific outcomes without exposing protected credential material to the merchant application process 116.

In some embodiments, the renewal evidence linker 250 records continuity across renewal and partition events by linking leg results, renewal events, partial captures, partial refunds, credits, reversals, or charge reallocations to one or more evidence products. Such linkage may permit later derivation of renewal-specific evidence views, split-tender-specific evidence views, and continuity-aware dispute packages while preserving attested checkout, credential confinement, and transaction-specific compliance proof.

In some embodiments, continuity across renewal and partition events additionally captures partial shipments, partial captures, partial refunds, charge reallocations, stored-value depletion, subsidy-leg failure, benefit exhaustion, or allowance exhaustion so that later verifiers can evaluate leg-specific lineage and continuity-aware dispute outcomes without requiring disclosure of raw PAN or SAD.

P. Audience-Specific Dispute and Compliance Evidence Packages

In further embodiments, the system may additionally implement one or more evidence-package-selection, representment-packet-building, fraud-investigation-export, and audience-policy-matrix functions. These functions may operate on the CEB and related digests to derive audience-specific packages for representment, chargeback response, fraud review, processor review, issuer review, auditor review, regulator review, internal investigations, or other downstream workflows.

In some embodiments, the evidence-package selector 252 derives multiple packages from a common evidence base, such as: a merchant representment pack emphasizing an authorization trace digest, machine-verifiable authentication evidence when step-up authentication was performed, or a signed policy-evaluation record when step-up authentication was not required, together with selected confinement indicators; an issuer or acquirer review pack emphasizing protocol-verifiable authentication results, no-step-up determinations, freshness evidence, and settlement-adjacent facts; and an auditor or regulator pack emphasizing attestation measurement, control mapping, scope-reduction assertions, or a richer evidence lineage.

In some embodiments, the common evidence base further includes a reason-code-family reference, an evidence-lineage digest, a chain-of-custody manifest, a measurement continuity digest, or a verifier-profile identifier so that downstream packages can be tailored to issuer, acquirer, processor, merchant, auditor, regulator, or machine-readable rebuttal workflows without losing proof of evidentiary basis.

The representment packet builder 254 and the fraud investigation exporter 256 may additionally include reason-code-family mapping, chain-of-custody data, evidence-lineage digests, refund or reversal references, post-authorization adjustments, shipment or fulfillment confirmations, non-sensitive transaction references, or failure-record references appropriate to a dispute scenario. In illustrative embodiments, evidence packages may be tailored for account-takeover review, friendly-fraud review, step-up-failure analysis, no-step-up-policy analysis, or other transaction-investigation modes while preserving PAN/SAD non-export and policy-governed disclosure boundaries.

In some embodiments, a machine-readable rebuttal packet or dispute outcome certificate may be generated from one or more audience-specific packages. Such a packet or certificate may attest that a designated verifier profile was applied, that a selected evidence subset satisfied packaging rules, and that any omitted material was omitted according to profile-specific disclosure policy rather than by evidentiary loss.

Q. Agent-Mediated Checkout Profiles and Human Confirmation Constraints

In further embodiments, the system may support agent-mediated checkout by implementing one or more agent-checkout-policy, agent-descriptor-validation, human-confirmation, and category-and-spend-control functions. These functions may operate when a purchase request 114 is initiated, assembled, or transmitted by a software assistant, voice agent, chat-based agent, or other machine-mediated component acting for or with a human principal.

An agent-mediated purchase request may include or be associated with an agent descriptor identifying an agent class, tool class, authority scope, session digest, principal association, or task identifier. In some embodiments, the agent descriptor further includes or references an authority manifest or authority-scope digest defining permitted merchants, categories, spend caps, velocity limits, or re-confirmation rules. The agent descriptor validator 262 may normalize or verify one or more such fields before purchase completion and may cause the system 100 to bind an agent descriptor digest into the canonicalized purchase context, into the authorization trace digest, or into a selective-disclosure CEB view without requiring export of full conversational content.

In some embodiments, the authority manifest or authority-scope digest is itself bound to a policy profile, a freshness value, a principal reference, a merchant-of-record identifier, or a task reference so that delegated or machine-mediated authority can be validated without revealing hidden prompts or internal reasoning traces.

In illustrative embodiments, the human confirmation engine 264 requires a human-visible confirmation summary before completion of one or more classes of purchases, such as purchases exceeding a threshold amount, purchases within a high-risk category, subscription changes, recurring renewals, international transactions, or transactions directed to a new merchant or counterparty. Confirmation constraints may specify summary fields, consent horizon, re-confirmation intervals, stale-context handling, merchant-of-record change triggers, material-variance triggers, or escalation rules when materially changed price, quantity, destination, merchant identity, or policy terms are detected.

In some embodiments, successful human confirmation produces a human-confirmation digest or equivalent signed confirmation reference that is bound to the canonicalized purchase context, the applicable authority manifest, and a freshness value, and that may be included in or referenced by the CEB, a renewal evidence chain, or a dispute package.

The category-and-spend controller 266 may enforce per-agent and per-principal spend caps, merchant allow-lists, category guards, time-of-day limits, velocity limits, re-affirmation triggers, delegated-tool restrictions, sub-agent restrictions, or human-in-the-loop requirements. Evidence products derived from the CEB may include a machine-verifiable indication that such constraints were satisfied, while omitting raw agent prompts, hidden reasoning, or other sensitive non-essential context except where policy expressly authorizes disclosure.

In some embodiments, delegated or machine-mediated authority is represented as a delegation chain of one or more signed delegation receipts binding a delegator, a delegate, an authority manifest or authority-scope digest, a purpose limitation or task reference, and a freshness or expiry value, such that downstream scope reduction and revocation state remain verifier-usable without requiring disclosure of hidden prompts or internal reasoning traces.

In some embodiments, agent-mediated execution is partitioned into read mode, draft mode, and act mode, and transition to act mode is permitted only upon satisfaction of one or more applicable act-mode predicates including a live permit, a fresh authority manifest, a fresh human-confirmation digest, a freshness threshold, or another policy-designated escalation rule.

R. Transport Binding, Token Lifecycle, and Verifier Profiles

In further embodiments, the system may additionally implement one or more transport-binding, session-continuity, token-lifecycle, verifier-profile, and key-rotation or revocation-management functions. These functions may cooperate with the checkout sidecar 110, the payment execution enclave 120, and the compliance exporter 160 to preserve cryptographic and policy continuity across transport establishment, session resumption, export operations, and token-related events.

In illustrative embodiments, the transport binder 268 binds a transport session, channel-binding value, session identifier, or equivalent transport attribute to an attestation measurement, a canonicalized purchase context, or both, so that evidence and payment operations remain linked to a verified trust boundary. Session resumption may be permitted only when the session continuity manager 270 verifies measurement continuity, freshness conditions, a resumption counter, and any required policy predicates; otherwise the system 100 may require re-attestation, re-authentication, renewed policy evaluation, or both.

In some embodiments, the session continuity manager 270 computes or verifies a measurement continuity digest that links a prior attestation measurement, a transport-binding value, a resumption counter, and one or more token-lifecycle states so that later verifiers can determine whether a resumed session remained within an authorized continuity envelope.

In some embodiments, the token lifecycle controller 272 governs issuance, refresh, reissue, revocation, rotation, re-binding, expiration, supersession, and termination of a network-routable payment instrument, an evidence-access token, or another transaction-scoped artifact derived from the protected checkout flow. Token lifecycle events may be reflected in the CEB, a renewal evidence chain, a dispute-ready evidence view, a measurement continuity digest, or another evidence product so that later verifiers can distinguish valid continuity from stale, revoked, superseded, or policy-incompatible artifacts.

In some embodiments, token supersession semantics distinguish refresh, reissue, rotate, revoke, re-bind, and supersede states, and may associate each state transition with a freshness value, export profile, verifier class, or continuity rule so that later packages can explain why a prior artifact remained acceptable, became stale, or was superseded by policy.

The verifier profile store 274 may maintain audience-specific export rules, cryptographic-suite preferences, freshness thresholds, retention windows, control-mapping selections, disclosure policies, or signature-scope selections for one or more verifier classes such as merchants, processors, issuers, acquirers, auditors, regulators, or internal risk functions. In this manner, a common evidence substrate may be re-expressed in profile-specific forms while still preserving proof of measurement continuity, transport continuity, token-lifecycle state, and evidentiary basis.

In some embodiments, the renewal, split-tender, dispute-packaging, agent-mediated checkout, transport-binding, delegation-chain, revocation-propagation, and mode-separation features described herein are implemented as logical functions, services, records, manifests, receipts, workflows, policy packs, or distributed control layers executed across one or more cooperating components, and need not be separately depicted in the drawings unless required for a particular claimed embodiment.

Such features may operate in cooperation with, be embedded in, be referenced by, or be summarized within the checkout sidecar 110, the payment execution enclave 120, the CEB generator 150, the compliance exporter 160, the policy enforcement controller 170, a selective-disclosure export, a dispute package, a renewal evidence chain, a delegation-state view, a mode-transition record, or another evidence product, without requiring dedicated figure-specific reference numerals for every logical function, workflow state, policy element, or packaging variation.

S. Additional Embodiments and Non-Limiting Language

The disclosed subject matter may be embodied, without limitation, as a system, a computer-implemented method, or a non-transitory computer-readable medium storing instructions that, when executed by one or more processors, cause one or more computing systems to perform any one or more of the operations, workflows, policy evaluations, attestation verifications, credential-confinement operations, digest computations, authentication operations, evidence-generation operations, export operations, and fail-closed control operations described herein. The specific protocols, interfaces, cryptographic mechanisms, trust anchors, tokenization systems, authorization systems, point-of-sale standards, and step-up authentication mechanisms described herein are illustrative and non-limiting. Equivalent mechanisms that provide substantially similar confinement, attestation, evidence binding, and fail-closed behavior are within the scope of the disclosure. In some embodiments, the non-transitory computer-readable medium comprises a tangible storage medium that stores such instructions and does not include a transitory signal per se.

The terms "comprise," "include," and variants are inclusive. Singular terms may include plural instances and vice versa unless the context clearly requires otherwise. Directional, deployment, or audience labels are used for explanation and do not limit implementation order, topology, or administrative boundary unless expressly recited.

Reference numerals are provided for explanatory convenience and do not require every claimed embodiment to include every numbered component or to arrange those components exactly as shown in any particular figure.

REFERENCE NUMERALS (FIGS. 1-11)

100 system.

110 checkout sidecar; 112 merchant checkout interface; 114 purchase request; 116 merchant application process; 118 mutually authenticated transport.

120 payment execution enclave; 122 trusted compute boundary; 124 attestation verifier; 126 credential unseal module; 128 confinement controller; 130 payment instrument generator.

140 step-up authentication orchestrator; 144 authentication evidence collector; 146 canonical transcript builder.

150 CEB generator; 154 signature module; 160 compliance exporter; 170 policy enforcement controller.

180 token service provider interface; 182 payment-processor or acquirer interface.

190 point-of-sale device; 192 secure element; 200 append-only compliance audit store; 202 offline cache; 204 selective-disclosure engine; 206 dispute-ready evidence view.

242 renewal evaluator; 244 subscription cadence policy store; 246 partitioned consideration engine; 248 leg-specific settlement controller; 250 renewal evidence linker; 252 evidence-package selector; 254 representment packet builder; 256 fraud investigation exporter; 258 audience policy matrix; 260 agent checkout policy pack; 262 agent descriptor validator; 264 human confirmation engine; 266 category-and-spend controller; 268 transport binder; 270 session continuity manager; 272 token lifecycle controller; 274 verifier profile store; 276 key-rotation and revocation service.

APPENDICES (ILLUSTRATIVE; NON-LIMITING)

The appendices provide additional illustrative embodiments, schemas, matrices, field sets, examples, definitions, implementation profiles, and policy-oriented packaging descriptions that may support one or more embodiments of the disclosed subject matter. Certain appendices, including Appendices W and X, may describe logical functions, workflow states, distributed services, manifests, receipts, policy packs, or packaging variations that need not be separately depicted in the drawings unless required for a particular claimed embodiment. Unless expressly recited in a claim, no appendix, appendix heading, schema, matrix, field name, example, profile, workflow, or package class is required in every embodiment.

Matter described in one appendix may be used alone, in combination with matter from one or more other appendices, or together with matter described in the body of the specification or the drawings. Fields, digests, manifests, profiles, receipts, certificates, views, packages, records, predicates, rules, matrices, and workflow elements shown in a particular appendix are illustrative, and a given embodiment may omit, reorder, partition, merge, rename, enrich, or otherwise vary such elements while preserving verifier-usable confinement, attestation, evidence binding, policy evaluation, selective disclosure, and fail-closed behavior.

Appendix examples, workflows, matrices, and schemas are provided to facilitate understanding and implementation and do not limit claim scope to a particular protocol, field ordering, serialization format, packaging format, administrative boundary, audience partition, deployment topology, or storage arrangement unless expressly recited. A verifier-usable value described as a digest, receipt, record, manifest, profile, certificate, view, or package may be represented in one or more data structures, may be embedded in or referenced by another evidence object, and may be distributed across multiple cooperating records or stores.

Terms introduced in Appendix A and elsewhere are labels of descriptive convenience and may refer to a component, module, service, record, view, field set, schema element, or logical function implemented as a single element or as multiple cooperating elements. References among appendices are explanatory and do not require identical naming, identical field populations, identical packaging, or co-location in a single file, export object, message, or storage boundary.

APPENDIX A—GLOSSARY

Checkout sidecar: a proxy, gateway, interposition layer, or equivalent component deployed in front of a merchant checkout interface to intercept purchase requests and enforce credential exclusion.

Merchant application process: business-logic software that may assemble orders, compute taxes, coordinate fulfillment, or otherwise participate in commerce workflows, but that is not trusted to process raw payment credentials.

Trusted compute boundary: an attested execution boundary, secure module, or equivalent integrity-protected execution domain within which credential unseal and protected credential handling are permitted.

Data-flow confinement digest: a transaction-specific digest attesting that protected credential handling remained confined to the trusted compute boundary.

Network-routable payment instrument: a token, surrogate, cryptogram, or equivalent derived artifact suitable for downstream authorization without exposing raw PAN or SAD.

Machine-verifiable authentication evidence: verifier-usable evidence that an authentication event occurred and is cryptographically bound to a canonical transaction representation.

Canonicalized purchase context: deterministic purchase-relevant data sufficient to bind evidence to a purchase while excluding raw PAN and SAD by design.

Compliance Evidence Bundle (CEB): a digitally signed evidence object that binds trust-boundary evidence, credential-confinement evidence, authorization evidence, and, when applicable, authentication evidence or a signed policy-evaluation record indicating that step-up authentication was not required, such that multiple audience-specific evidence products can be derived without losing verifiability.

Auditor-mode CEB: an evidence product intended for deep compliance review, generally richer than a privacy-preserving export view.

Selective-disclosure CEB view: an evidence product that redacts personal data while preserving verifiability of selected evidence elements.

Scope-reduction certificate: an evidence product asserting that a merchant application process did not store, process, or transmit PAN data, with verifiable references to trust-boundary evidence.

Dispute-ready evidence view: an evidence product emphasizing an authorization trace digest and, as applicable, machine-verifiable authentication evidence when step-up authentication is performed or a signed policy-evaluation record when step-up authentication is not required, together with selected freshness metadata and non-sensitive transaction linkage, usable in chargeback rebuttal or fraud investigation.

Compliance control mapping: a mapping between evidence fields and one or more control objectives, identifiers, or compliance requirements.

Fail-closed: an operating mode in which purchase completion is blocked when required attestation, confinement, or authentication conditions are not satisfied.

Agent-assisted purchase flow: a purchase flow in which a software assistant or other machine-mediated component participates under authorized constraints while protected credential handling remains confined as disclosed herein.

Renewal evidence chain: a linked set of evidence references associating a recurring or subsequent billing event with one or more prior transaction or CEB references while allowing each cycle to be independently re-attested, re-evaluated, or blocked.

Partitioned consideration vector: a structured representation in which a total amount or other consideration is divided across multiple tender legs, each leg being separately evaluable under policy and separately capable of approval, denial, freeze, reversal, refund, or clawback.

Audience-specific evidence package: an export package derived from a common evidence substrate and tailored to a verifier class, dispute function, or compliance workflow according to profile-specific disclosure and packaging rules.

Agent descriptor: non-sensitive metadata identifying an agent class, authority scope, session digest, tool class, principal association, task identifier, or equivalent machine-mediated checkout context.

Human confirmation constraint: a rule requiring one or more human-visible confirmation fields, thresholds, re-confirmation intervals, or escalation conditions before purchase completion.

Transport binding: a cryptographic or verifier-usable association between a transport session or channel-binding value and one or more trust-boundary, purchase-context, or freshness values.

Token lifecycle record: a record reflecting issuance, refresh, reissue, revocation, rotation, re-binding, expiration, or supersession of a payment-related or evidence-related token or artifact.

Verifier profile: a policy bundle or profile defining export fields, disclosure boundaries, cryptographic preferences, freshness thresholds, retention behavior, or control mappings for a verifier class.

Signed policy-evaluation record: a machine-verifiable signed record indicating that step-up authentication was evaluated under an applicable policy profile and determined to be not required for a particular purchase.

Signature scope: a deterministic set of values covered by a digital signature for a CEB or related evidence object, such as a transaction identifier or nonce, attestation measurement, confinement digest, authorization trace digest, canonicalized purchase-context digest, freshness value, export-profile digest, and a digest of authentication evidence or of a signed policy-evaluation record.

Scope-reduction proof basis: a set of measured evidence inputs from which a scope-reduction certificate or related signed assertion is generated, including, by way of illustration, an attestation measurement, a confinement digest, an egress-policy digest, a process-boundary classification digest, a memory-access audit digest, a telemetry-sanitization digest, a zeroization-event digest, or tokenization-event provenance.

Measurement continuity digest: a digest or equivalent verifier-usable value linking an attestation measurement, a transport or session continuity state, and one or more token-lifecycle states.

Authority manifest: a policy-bound description of delegated or machine-mediated purchase authority, such as permitted merchants, categories, thresholds, spend caps, re-confirmation rules, freshness constraints, or principal associations.

Human-confirmation digest: a digest or signed reference showing that a required human confirmation summary was presented, acknowledged, or otherwise satisfied for a purchase, renewal, or materially changed transaction context.

Delegation chain: a linked sequence of one or more delegation hops extending from a human principal, enterprise principal, wallet principal, policy-bound service account, or other originating authority source to one or more personal agents, colleague agents, sub-agents, tools, or enterprise systems that participate in a transaction-scoped workflow.

Delegation hop: an individual authority-transfer step within a delegation chain, associated with a delegator, a delegate, an authority scope, a purpose limitation, a freshness condition, or a re-delegation rule.

Delegation receipt: a signed or otherwise machine-verifiable record representing a delegation hop and cryptographically binding a delegator identity or descriptor, a delegate identity or descriptor, an authority manifest or authority-scope digest, a purpose limitation or task reference, and a freshness value or expiry value.

Re-delegation policy: a rule defining whether a delegate may further delegate authority to another agent, tool, or service, and, if so, under what hop limit, scope-reduction rule, freshness condition, tool-class restriction, principal-class restriction, or purpose limitation.

Non-transitive delegation: a delegation rule under which a delegate may perform an authorized action but may not further delegate the authority to another agent, tool, or service unless re-delegation is expressly permitted.

Revocation propagation: transmission or application of a revocation state, revocation epoch, revocation digest, or equivalent revocation effect across one or more delegation hops, agents, tools, verifier profiles, continuity records, token-lifecycle records, or downstream protected actions.

Revocation receipt: a signed or otherwise machine-verifiable record indicating that one or more delegation hops, authority manifests, scope digests, or downstream actions have been revoked, invalidated, quarantined, frozen, or placed on hold.

Delegation-state view: an audience-specific evidence view showing delegated authority, scope reduction, freshness, re-delegation status, revocation state, or lineage state for one or more delegation hops without requiring disclosure of hidden prompts, internal reasoning traces, or non-essential source content.

Mode class: an execution classification indicating whether an agent-mediated operation is in read mode, draft mode, act mode, or another policy-distinguished execution state.

Read mode: a mode in which retrieval, indexing, summarization, ranking, extraction of bounded non-sensitive fields, reference generation, or provenance generation is permitted, while protected execution events remain prohibited.

Draft mode: a mode in which a proposed message, request, approval artifact, purchase artifact, refund artifact, dispute artifact, or other action candidate may be prepared, but not finally transmitted, committed, approved, settled, or otherwise executed.

Act mode: a mode in which a protected execution event may proceed only after satisfaction of one or more designated act-mode predicates, such as a live permit, fresh authority manifest, fresh human-confirmation digest, dual approval, freshness threshold, measurement continuity check, or category-specific escalation rule.

Mode-transition record: a signed or otherwise machine-verifiable record representing a transition between execution modes and cryptographically binding a prior mode, a requested mode, an authority manifest or authority-scope digest, a task reference or purpose digest, and a freshness value, act window, or execution-context digest.

Draft artifact digest: a digest or equivalent verifier-usable value representing a draft message, draft purchase artifact, draft approval artifact, draft dispute package, recommendation artifact, summary artifact, or other non-final candidate action.

Draft-to-act consistency view: an audience-specific evidence view showing whether a protected act-mode event was consistent with a previously reviewed, confirmed, or policy-evaluated draft artifact, recommendation artifact, or summary artifact.

Live permit: a permit, approval, authorization token, or equivalent verifier-usable authorization state that is current, unexpired, and sufficient under an applicable policy profile to permit transition to act mode or completion of another protected execution event.

Act window: a bounded time interval, freshness interval, or execution interval within which a protected act-mode transition or execution event remains authorized after a designated confirmation, permit, approval, or policy evaluation.

Export profile: a policy-defined export configuration, transform, or view specification governing how one or more evidence objects, digests, assertions, or records are redacted, partitioned, formatted, signed, withheld, or otherwise expressed for a designated audience, verifier class, or workflow.

Policy profile: a machine-usable or verifier-usable set of rules, thresholds, predicates, escalation conditions, freshness requirements, or decision criteria used to evaluate whether a step-up authentication event, mode transition, renewal event, delegated action, export decision, or other protected action is required, permitted, denied, held, frozen, or otherwise conditioned.

Baseline expectation digest: a digest or equivalent verifier-usable value representing a prior approved, expected, or policy-consistent transaction state, renewal state, purchase pattern, authority state, or confirmation state against which a later transaction-scoped event may be compared for variance detection.

Material-variance rule: a rule, threshold, classifier, or policy condition defining when a difference between a current transaction-scoped event and a baseline expectation is sufficiently significant to require renewed confirmation, renewed policy evaluation, renewed authentication, renewed attestation, a live permit, dual approval, or fail-closed blocking.

Evidence-lineage digest: a digest or equivalent verifier-usable value linking one or more evidence objects, records, assertions, package components, transaction references, or continuity references so that lineage, derivation, sequencing, or evidentiary consistency can be independently verified across an audit, dispute, representment, regulator, or machine-readable rebuttal workflow.

Chain-of-custody manifest: a structured record, manifest, or verifier-usable description identifying one or more creation, collection, transformation, packaging, transmission, storage, export, access, or review events associated with an evidence object, evidence package, or related transaction-scoped record.

Reason-code family reference: a code, label, digest, mapping, or verifier-usable reference identifying a dispute class, chargeback class, fraud-review class, representment class, policy-failure class, or other adjudication-relevant category to which a transaction, evidence package, failure record, rebuttal packet, or downstream review workflow pertains.

Merchant-of-record change trigger: a rule, state change, or verifier-usable indicator showing that a merchant-of-record identity, counterparty identity, settlement destination, or equivalent transaction anchor has changed in a manner sufficient to require renewed confirmation, renewed policy evaluation, renewed authentication, or fail-closed blocking.

Delegated-tool restriction: a rule, policy condition, or authority-scope limitation defining whether a delegated agent, sub-agent, or machine-mediated component may invoke a designated tool, service, connector, or enterprise system, and under what scope, freshness, or re-confirmation constraints.

Sub-agent restriction: a rule, policy condition, or authority limitation defining whether an agent may invoke, instantiate, coordinate with, or rely upon another agent, sub-agent, or personal-agent process, and under what scope-reduction, re-delegation, freshness, attestation, or confirmation requirements.

Token supersession reference: a record, digest, or verifier-usable reference indicating that a token, authorization artifact, evidence-access token, or transaction-scoped artifact has been superseded by a later-issued, later-bound, rotated, refreshed, reissued, or otherwise replacement artifact.

APPENDIX B—NORMATIVE CEB SCHEMA (ILLUSTRATIVE)

Recommended CEB core fields include: ceb_version, transaction_id, attestation_measurement, confinement_digest, authorization_trace_digest, canonical purchase_context_digest, authentication_evidence or policy_evaluation_record, signature_block, signature_scope_digest or signature_scope_descriptor, export_profile_id, and freshness metadata.

Optional fields include: scope_reduction_certificate_ref, dispute_view_ref, compliance_control_mapping_ref, offline_indicator, bounded_validity_window, selective_disclosure_profile, audience_policy_id, zero_knowledge_predicate_ref, policy_profile_digest, reason_code_family_ref, measurement_continuity_digest, authority_manifest_ref, and human_confirmation_digest_ref.

In some embodiments, the canonical purchase context is represented as a deterministic object whose fields exclude raw PAN and SAD and whose digest is included in the signature scope.

In some embodiments, when step-up authentication is performed, authentication_evidence includes a result code, protocol identifier, verifier output, and a binding value tying the evidence to the canonical purchase context or to an authentication transcript digest. In some embodiments, when step-up authentication is not required, policy_evaluation_record includes a not-required indicator, a policy profile or policy-profile digest, a transaction identifier or nonce, a canonical purchase-context digest, an optional reason code, and a signature or verifier-usable proof.

The signature_block may include one or more signatures, algorithm identifiers, key identifiers, signature-scope identifiers, or freshness values sufficient for independent validation. In illustrative embodiments, the signature scope includes at least a transaction identifier or nonce, attestation_measurement, confinement_digest, authorization_trace_digest, and a digest of authentication_evidence or of policy_evaluation_record, and may further include canonical_purchase_context_digest, freshness metadata, or export-profile metadata.

In some embodiments, the CEB expressly indicates whether the transaction followed a step-up-authentication path or a policy-determined no-step-up path, and verifier profiles govern whether a downstream package exposes the full authentication evidence, the signed policy-evaluation record, selected digests thereof, or only a verifier-usable indication of applicability.

APPENDIX C—CONFINEMENT DIGEST COMPUTATION (PSEUDOCODE)

Illustrative inputs: attestation_measurement, measured_egress_policy_digest, process_boundary_classification_digest, memory_access_audit_digest, and tx_nonce.

Illustrative computation: confinement_digest=H(attestation_measurement measured_egress_policy_digest||process_boundary_classification_digest memory_access_audit_digest||tx_nonce).

In some embodiments, memory_access_audit_digest is derived from protected memory-export denials, secure-element cryptogram generation events, tokenization events, zeroization confirmations, sealed key access events, or a credential_handling_digest folded into the memory-access audit digest.

The digest function H may be any cryptographic hash or equivalent commitment function providing collision resistance or equivalent integrity properties appropriate to the deployment.

APPENDIX D—STEP-UP AUTHENTICATION EVIDENCE AND POLICY-EVALUATION MODEL

When step-up authentication is performed, core evidence structure may include: auth_result_code+cryptographic verifier output or signature+canonical_auth_transcript_digest.

3DS option: evidence includes an issuer-signed result, directory-server signed result, access-control-server signed result, or combination thereof, bound to a 3DS transaction identifier.

When step-up authentication is not required, a signed policy-evaluation record may include a not-required indicator, a policy profile or policy-profile digest, a canonicalized purchase-context digest, a transaction identifier or nonce, an optional reason code, and a signature or other verifier-usable proof.

Either authentication evidence or a signed policy-evaluation record may be embedded in, or referenced by, a CEB and exported according to profile-specific disclosure policy. In some embodiments, the CEB or an associated export profile indicates which branch applied and which fields or digests form part of the signature scope.

APPENDIX E—POS/EMV/OFFLINE PROFILE

In point-of-sale embodiments, a secure element may generate an EMV authorization cryptogram or equivalent cryptographic payment artifact.

The authorization trace digest may bind the EMV authorization cryptogram, terminal context, and canonicalized purchase context.

Offline caching may store an auditor-mode CEB together with an offline indicator, bounded validity window, and local freshness value.

Upon reconnection, the system may export cached evidence, request step-up authentication, mark evidence stale, or block purchase completion depending on the configured offline policy.

Illustrative offline reconciliation states include OFFLINE_BUFFERING, RECONNECT_PENDING, STALE, REQUIRE_STEP_UP_ON_RECONNECT, HOLD_CAPTURE, and HOLD_SETTLEMENT. State transitions may depend on a floor-limit policy, an offline-risk class, a bounded validity window, a device-time-drift threshold, or a resumption-counter threshold.

In some embodiments, offline-to-online reconciliation also verifies a measurement continuity digest so that later verifiers can determine whether a cached evidence object remained within an authorized continuity envelope during the offline interval.

APPENDIX F—SELECTIVE DISCLOSURE AND ZERO-KNOWLEDGE PREDICATES

A selective-disclosure export may redact personal-data fields while preserving verifiable digests for the canonicalized purchase context, authorization trace digest, attestation measurement, and, as applicable, selected machine-verifiable authentication evidence or a signed policy-evaluation record indicating that step-up authentication was not required for the purchase.

Optional zero-knowledge predicates may attest satisfaction of age threshold, residency constraint, spend-cap constraint, merchant-category constraint, or equivalent policy predicates without revealing raw personal data.

A proof may be bound to a transaction identifier, attestation measurement, export profile, or canonicalized purchase context digest.

Predicate proofs may be audience-specific so that different verifiers receive different proof objects or different disclosure scopes from a common underlying CEB.

APPENDIX G—FAILURE CODE TAXONOMY

Illustrative failure codes include: attestation failure, minimization_violation, authentication_evidence_invalid, authentication_evidence_missing, policy_mismatch, measurement_revoked, stale_offline_evidence, transport_binding_failure, policy_evaluation_record_invalid, policy_evaluation_record_missing, measurement_continuity_failure, and signature_scope_mismatch.

Failure records preferably exclude PAN and SAD and may include a non-sensitive transaction reference, time value, digest set, remediation route, and operator-facing explanation.

Failure-code taxonomies may be extended or partitioned by audience, deployment environment, or merchant profile.

APPENDIX H—WORKED EXAMPLES

Example 1—Web checkout, no step-up. The checkout sidecar intercepts the purchase request, protected credential fields are excluded from the merchant application process, the trusted compute boundary attests successfully, a tokenization surrogate is forwarded, authorization succeeds, a signed policy-evaluation record indicates that step-up authentication was not required, a CEB is generated and signed over a transaction-scoped signature scope, and an auditor-mode CEB plus scope-reduction certificate are exported.

Example 2—High-risk checkout with step-up. The policy condition triggers 3DS, machine-verifiable authentication evidence is collected, authorization and authentication are bound to the same canonicalized purchase context, and a dispute-ready evidence view is exported.

Example 3—POS offline checkout. A secure element generates an EMV authorization cryptogram, an auditor-mode CEB is cached with an offline indicator, and upon reconnection the cached evidence is exported or marked stale depending on policy.

APPENDIX I—DEPLOYMENT PROFILES AND TRUST-BOUNDARY PARTITIONS

Merchant-hosted profile: the checkout sidecar is deployed adjacent to a merchant checkout interface, while the trusted compute boundary executes in a local enclave or HSM-backed appliance.

Gateway-hosted profile: the checkout sidecar executes at a gateway edge, while the trusted compute boundary executes in a remotely attestable service partition.

Processor-hosted profile: a processor or acquirer hosts the trusted compute boundary and evidence-export services while the merchant hosts the sidecar and non-sensitive business logic.

Wallet- or user-device-assisted profile: a wallet or user device contributes policy, identity, or non-sensitive purchase-context data while protected credential handling remains confined to the trusted compute boundary.

POS profile: a terminal-side secure element participates in protected credential handling and cryptogram generation while evidence products are exported locally, remotely, or both.

APPENDIX J—COMPLIANCE CONTROL MAPPING EXAMPLES

Illustrative evidence-to-control mappings include: attestation_measurement→trusted execution integrity objective; confinement_digest→credential exposure minimization objective; authorization_trace_digest→authorization provenance objective; authentication_evidence→strong authentication evidence objective; policy_evaluation_record→step-up-not-required proof objective; scope_reduction_certificate→merchant credential-handling exclusion objective.

Control mappings may be represented as identifiers, labels, machine-readable policies, human-readable annotations, or combinations thereof.

Different audiences may receive different control mappings even where the underlying evidence derives from the same CEB.

APPENDIX K—EVIDENCE-PRODUCT MATRIX

Auditor-mode CEB: primary audience=auditors, processors, or internal compliance teams; typical contents=attestation measurement, confinement digest, authorization trace digest, and, as applicable, machine-verifiable authentication evidence or a signed policy-evaluation record, together with selected freshness metadata.

Selective-disclosure CEB view: primary audience=merchants, privacy-sensitive reviewers, or regulated disclosers; typical contents=redacted data fields plus verifiable digests, optional zero-knowledge predicates, and, as applicable, selected machine-verifiable authentication evidence or a signed policy-evaluation record.

Scope-reduction certificate: primary audience=merchants, assessors, or enterprise compliance functions; typical contents=a signed assertion of credential-handling exclusion plus references to attestation measurement, confinement digest, and, as applicable, measured egress-policy, process-boundary-classification, or memory-access-audit evidence.

Dispute-ready evidence view: primary audience=chargeback, fraud, or dispute-resolution functions; typical contents=authorization trace digest, machine-verifiable authentication evidence when step-up authentication is performed, or a signed policy-evaluation record when step-up authentication is not required, together with selected freshness metadata and non-sensitive transaction linkage.

APPENDIX L—ALTERNATIVE EMBODIMENTS AND NON-LIMITING VARIANTS

Trusted compute boundaries may be implemented with TEEs, HSMs, secure enclaves, secure elements, or combinations thereof.

Payment instruments may include tokens, surrogates, cryptograms, single-use instruments, limited-use instruments, or equivalent derived authorization artifacts.

Step-up authentication may be implemented with 3DS or with other authentication frameworks that produce machine-verifiable evidence.

The disclosed architecture may be used for human-initiated checkout, wallet-assisted checkout, agent-assisted checkout, card-present flows, card-not-present flows, and mixed-channel commerce flows so long as protected credential handling remains confined as described herein.

APPENDIX M—RENEWAL/SUBSCRIPTION/SPLIT-TENDER SCHEMA

Illustrative renewal-related fields include: parent_transaction_ref, parent_ceb_ref, renewal period_id, cadence_value, consent_horizon, grace_indicator, proration_basis, renewal_policy_digest, renewal_attestation_ref, and renewal_authentication_ref.

Illustrative split-tender fields include: partitioned_consideration_vector, leg_id, leg_amount, leg_currency, leg_instrument_class, leg_policy_profile, leg_authentication_requirement, leg_trace_digest, leg_result_code, and leg_failure_ref.

Renewal and split-tender schemas may additionally capture partial capture, partial refund, reversal, credit, benefit exhaustion, allowance exhaustion, or charge reallocation events, with linkage fields sufficient to trace each event to one or more CEB-derived evidence products.

In some embodiments, continuity across recurring or partitioned events is represented as a renewal evidence chain that can be independently verified without exposing PAN, SAD, or full customer-identifying context.

In some embodiments, renewal and split-tender continuity additionally includes baseline_expectation_digest, material_variance_digest, leg_dispute_package_ref, partial_capture_ref, partial_refund_ref, charge_reallocation_ref, stored_value_depletion_ref, subsidy_leg_failure_ref, or benefit_exhaustion ref.

APPENDIX N—DISPUTE/CHARGEBACK/FRAUD EVIDENCE MATRIX

Illustrative package classes include: merchant representment pack, processor review pack, issuer review pack, fraud investigation pack, regulator or auditor pack, and machine-readable rebuttal packet.

A merchant representment pack may emphasize authorization trace digest, machine-verifiable authentication evidence when step-up authentication is performed, or a signed policy-evaluation record when step-up authentication is not required, confinement digest indicators, scope-reduction assertions, selected fulfillment confirmations, and non-sensitive transaction references appropriate to a representment workflow.

A fraud investigation pack may further include evidence-lineage digest, chain-of-custody fields, reason-code-family mapping, failure-record references, device or session continuity indicators, and references to refund, reversal, or post-authorization adjustment events where policy allows.

A dispute outcome certificate may attest that a designated verifier profile was used to package evidence, that required fields were present or not-applicable, and that omitted fields were omitted under policy rather than lost or destroyed.

In some embodiments, package rules differ depending on whether step-up authentication was performed or was determined not to be required, so that a merchant representment pack, processor review pack, or dispute outcome certificate can include either machine-verifiable authentication evidence or a signed policy-evaluation record, together with any profile-permitted continuity, freshness, and evidentiary-basis indicators.

APPENDIX O—SCOPE-REDUCTION PROOF SCHEMA AND CONTROL MAPPING

Illustrative scope-reduction assertions may separately address non-storage, non-processing, and non-transmission of PAN data, as well as non-export of SAD, outside a designated trusted compute boundary, and may be expressed as a signed assertion generated from a scope-reduction proof basis.

Supporting digests or indicators may include attestation_measurement, confinement_digest, measured_egress_policy_digest, process_boundary_classification_digest, memory_access_audit_digest, process-lineage digest, memory-export restriction digest, telemetry-sanitization digest, zeroization-event digest, and tokenization-event provenance digest.

Control mappings may associate such digests or assertions with one or more internal control identifiers, assessor objectives, payment-security objectives, or verifier-specific policy labels without implying admission that any listed framework constitutes prior art or exhaustive legal requirement.

Multiple verifier profiles may consume different subsets of the same scope-reduction proof schema, such as a rich assessor view, a merchant-facing certificate view, and a regulator-facing view preserving greater lineage depth, while retaining verifiable references to the measured evidence basis from which the signed assertion was generated.

In some embodiments, the scope-reduction certificate expressly indicates whether the signed assertion was generated based at least on attestation_measurement, confinement_digest, measured_egress_policy_digest, process_boundary_classification_digest, memory_access_audit_digest, or a selected subset thereof, so that later verifiers can determine the evidentiary basis of the exclusion claim.

APPENDIX P—AGENT-MEDIATED CHECKOUT POLICY PACK

Illustrative policy-pack fields include: agent_descriptor, agent_class, principal_ref, task_ref, session_digest, merchant_allow_list, category_allow_list, category_deny_list, spend_cap, velocity_limit, consent_horizon, re-confirmation_interval, and escalation_rule.

A human confirmation summary may include merchant identity, item class, quantity, price, total amount, renewal status, destination or service window, selected payment class, and one or more reason-for-escalation fields when a threshold or policy trigger is met.

Policy packs may require re-affirmation when a merchant changes, when a price or quantity deviates from a prior summary, when a new high-risk category is detected, when a session becomes stale, or when a recurring charge differs materially from a baseline expectation.

In some embodiments, agent-mediated evidence exports include an agent descriptor digest and a confirmation-status indication while excluding hidden prompts, raw reasoning traces, or other non-essential agent context except where policy expressly authorizes disclosure.

In some embodiments, agent-mediated policy packs additionally include authority_manifest_digest, human_confirmation_digest_ref, merchant_of_record_change_flag, material_variance_flag, stale_context_timeout, delegated_tool_permission_flag, or sub_agent_permission_flag so that later packages can explain why a purchase remained within or outside an authorized delegation envelope.

APPENDIX Q—ATTESTED TRANSPORT/SESSION/TOKEN LIFECYCLE PROFILE

Illustrative transport-binding fields include: session_id, peer_id, channel_binding_value, transport_attestation_ref, measurement_ref, session_freshness_value, resumption_counter, and export_profile_ref.

Continuity rules may require re-attestation, re-authentication, or both when measurement continuity fails, when a resumption window expires, when a freshness threshold is not met, or when a designated verifier profile requires a stricter continuity check.

Illustrative token-lifecycle events include issue, refresh, reissue, revoke, rotate, re-bind, expire, supersede, and terminate; one or more such events may be reflected in a CEB, a dispute package, or a continuity record bound to the canonicalized purchase context.

Verifier profiles may define audience-specific cryptographic suites, retention windows, freshness requirements, export transformations, redaction rules, and proof-assembly behavior for merchants, processors, issuers, acquirers, auditors, regulators, or internal risk functions.

In some embodiments, verifier profiles or continuity records additionally include measurement_continuity_digest, token_supersession_ref, signature_scope_selection, or continuity_rule_id so that a downstream package can explain why a resumed session or rotated token remained acceptable, became stale, or was superseded by policy.

APPENDIX R—SIGNED POLICY-EVALUATION RECORD AND SIGNATURE-SCOPE SCHEMA

Illustrative signed policy-evaluation record fields include: transaction_id, nonce, canonical_purchase_context_digest, policy_profile_id or policy_profile_digest, not_required_indicator, reason_code, freshness_value, verifier_profile_ref, and signature_block.

In some embodiments, the signature_scope for a CEB or related evidence object includes at least transaction id or nonce, attestation_measurement, confinement_digest, authorization_trace_digest, and a digest of authentication_evidence or of policy_evaluation_record, and may further include canonical purchase_context_digest, freshness metadata, export_profile_id, authority_manifest_digest, or human_confirmation_digest_ref.

The signed policy-evaluation record may indicate that no step-up trigger fired, that a trigger was evaluated and suppressed under policy, that a threshold was not exceeded, or that a designated verifier profile determined no additional authentication was required, without implying that any unauthorized downgrade occurred.

In some embodiments, downstream exports include the full signed policy-evaluation record, a digest thereof, a verifier-usable indication thereof, or a profile-governed subset thereof, depending on audience-specific disclosure policy.

APPENDIX S-SCOPE-REDUCTION EVIDENCE-BASIS MATRIX

Illustrative basis classes for a scope-reduction certificate include attestation_measurement, confinement_digest, measured_egress_policy_digest, process_boundary_classification_digest, memory_access_audit_digest, telemetry_sanitization_digest, zeroization_event_digest, and tokenization_event_provenance_digest.

A merchant-facing certificate view may expose a signed assertion together with selected references to attestation_measurement and confinement_digest, while an assessor-facing view may additionally expose measured_egress_policy_digest, process_boundary_classification_digest, and memory_access_audit_digest or digests thereof.

In some embodiments, a regulator-facing view includes richer lineage depth and continuity indicators, and an internal-risk view includes additional remediation, routing, or threshold metadata, without altering the underlying signed assertion.

A basis matrix may indicate which evidence inputs were mandatory, optional, unavailable, redacted, profile-suppressed, or not-applicable for a given scope-reduction certificate.

APPENDIX T—OFFLINE RECONCILIATION AND STALENESS STATE MACHINE

Illustrative offline reconciliation states include OFFLINE_BUFFERING, RECONNECT_PENDING, STALE, REQUIRE_STEP_UP_ON_RECONNECT, HOLD_CAPTURE, and HOLD_SETTLEMENT.

Illustrative state-transition inputs include offline_risk_class, bounded_validity_window, device_time_drift, floor_limit, resumption_counter, measurement_continuity_digest, and policy_profile_id.

In some embodiments, a stale condition or failed continuity check causes re-attestation, re-authentication, renewed policy evaluation, capture hold, settlement hold, or a fail-closed stop according to a profile-specific rule.

Offline reconciliation packages may include continuity indicators, staleness indicators, local freshness metadata, and references to any subsequent authentication evidence or signed policy-evaluation record generated upon reconnection.

APPENDIX U—RENEWAL VARIANCE AND SPLIT-LEG CONTINUITY SCHEMA

Illustrative renewal-variance fields include baseline_expectation_digest, material_variance_digest, variance_rule_id, renewal_policy_digest, renewal_attestation_ref, renewal_authentication_ref, renewal_policy_evaluation_ref, and human_confirmation_digest_ref.

Illustrative split-leg continuity fields include leg_id, leg_policy_profile, leg_authentication_requirement, leg_trace_digest, leg_result_code, leg_failure_ref, leg_dispute_package_ref, and leg_continuity_ref.

In some embodiments, continuity records additionally capture partial captures, partial refunds, charge reallocations, stored-value depletion, subsidy-leg failure, benefit exhaustion, allowance exhaustion, or supersession of one leg by another.

A continuity schema may be used to determine whether a later renewal, adjusted charge, or leg-specific dispute package is materially consistent with a prior expectation envelope or instead requires renewed confirmation, renewed authentication, renewed policy evaluation, or fail-closed blocking.

APPENDIX V—REASON-CODE FAMILY/REPRESENTMENT/DISPUTE OUTCOME PACKAGING

Illustrative package descriptors include reason_code_family_ref, evidence_lineage_digest, chain_of_custody_manifest, verifier_profile_id, continuity_indicator_set, and dispute_outcome_certificate_ref.

A representment package may include authorization_trace_digest, selected confinement indicators, fulfillment or shipment confirmations, and either machine-verifiable authentication evidence or a signed policy-evaluation record depending on which branch applied for the transaction.

A dispute outcome certificate may attest that a designated verifier profile was applied, that mandatory evidence classes were present, not-applicable, or profile-suppressed, and that omitted fields were omitted according to policy rather than by evidentiary loss.

In some embodiments, machine-readable rebuttal packets are generated from one or more package descriptors and include references sufficient to reconstruct package lineage, continuity posture, and the evidentiary basis for any no-step-up determination or scope-reduction assertion.

APPENDIX W—DELEGATION CHAIN/REVOCATION PROPAGATION PROFILE

In some embodiments, delegated or machine-mediated purchase authority is represented as a delegation chain comprising one or more linked delegation hops extending from a human principal, enterprise principal, wallet principal, policy-bound service account, or other originating authority source to one or more personal agents, colleague agents, sub-agents, tools, or enterprise systems that participate in a protected checkout, settlement-adjacent, renewal, refund, reversal, or other transaction-scoped workflow.

Illustrative delegation-chain fields include: delegation_chain_id, delegation_hop_id, parent_hop_ref, origin_principal_ref, delegator_agent_descriptor_ref, delegate_agent_descriptor_ref, authority_manifest_ref, authority_scope_digest, purpose_digest, task_ref, merchant_of_record_ref, category_scope, amount_cap, velocity_limit, effective_time, expiry_time, freshness_value, max_hop_count, hop_index, re_delegation_policy, non_transitive_flag, confirmation_digest_ref, policy_profile_digest, verifier_profile_ref, measurement_continuity_ref, and revocation_epoch.

In some embodiments, each delegation hop is represented by a delegation receipt or equivalent signed delegation record that is cryptographically bound to at least: (i) a delegator identity or descriptor, (ii) a delegate identity or descriptor, (iii) an authority manifest or authority-scope digest, (iv) a purpose limitation or task reference, (v) a freshness value or expiry value, and (vi) a purchase context, canonicalized purchase-context digest, settlement-adjacent context digest, or equivalent transaction-scoped context value. One or more such delegation receipts may be embedded in, referenced by, or summarized within a CEB, a selective-disclosure export, a dispute package, or another evidence product.

Delegation scope may be reduced, but not expanded, at each downstream hop unless an applicable policy profile expressly permits scope expansion under a designated approval rule. In illustrative embodiments, a downstream hop cannot add a new merchant, new category, new counterparty, new budget class, or higher amount limit unless a live permit, renewed human confirmation, dual approval, or another designated escalation rule is satisfied.

In some embodiments, delegation is non-transitive by default, such that a delegate agent may perform an authorized action but may not further delegate the authority to another agent, tool, or service unless the originating authority manifest, a hop-specific re-delegation policy, or a verifier-usable signed delegation receipt expressly permits re-delegation. Where re-delegation is permitted, the permitted downstream scope may be narrower than the upstream scope and may be subject to a hop limit, purpose limit, freshness rule, principal class restriction, tool class restriction, or category restriction.

Revocation may propagate through the delegation chain in response to one or more revocation triggers including: principal offboarding, role change, reorganization, policy update, task completion, session expiry, stale confirmation, stale context, budget exhaustion, benefit exhaustion, merchant-of-record change, detected anomaly, attestation failure, shadow-agent detection, quarantine state, or a direct revocation instruction. In some embodiments, a revocation event is represented by a revocation receipt, revocation epoch update, revocation digest, or equivalent verifier-usable record that identifies one or more affected delegation hops or authority-scope digests.

In some embodiments, revocation propagation is fail-closed, such that upon detection of a revocation event affecting an upstream or parallel hop, the system denies, freezes, quarantines, holds, or requires renewed human confirmation for one or more downstream actions until a fresh delegation receipt, fresh authority manifest, or fresh policy evaluation is obtained. Revocation propagation may be immediate or near-immediate across personal agents, colleague agents, sub-agents, delegated tools, enterprise systems, verifier profiles, token-lifecycle records, and continuity records participating in the delegated workflow.

In illustrative embodiments, the system computes a delegation-chain digest, revocation-propagation digest, or equivalent verifier-usable lineage value linking one or more delegation receipts, revocation receipts, authority manifests, policy profiles, and transaction-scoped evidence values so that later verifiers can determine: (i) who delegated what authority to whom, (ii) whether downstream scope remained within authorized limits, (iii) whether re-delegation was permitted, (iv) whether a relevant revocation event had occurred, and (v) whether a denied, frozen, or completed action was consistent with the applicable delegation state.

In some embodiments, audience-specific evidence packages include a delegation-state view, a re-delegation-limit view, or a revocation-lineage view that omits hidden prompts, internal reasoning traces, chat contents, or work-file contents while preserving verifiable proof of delegated authority, purpose limitation, scope reduction, freshness, and revocation state. Such packages may be tailored for merchants, processors, issuers, auditors, regulators, enterprise security functions, internal investigations, or machine-readable rebuttal workflows.

Illustrative workflows include, without limitation: a human principal delegating limited vendor-payment authority to a personal agent; the personal agent requesting a bounded action from a colleague agent or a delegated tool; the downstream agent receiving a narrower scope than the upstream scope; and a later revocation event, role change, or stale-context determination causing the system to block purchase completion, settlement submission, approval, refund, reversal, or another protected transaction action unless renewed authority is obtained.

APPENDIX X—READ/DRAFT/ACT MODE SEPARATION

In some embodiments, agent-mediated operation is partitioned into execution modes including a read mode, a draft mode, and an act mode, so that retrieval, recommendation, preparation, transmission, approval, settlement, or other action classes can be separated according to distinct policy envelopes and fail-closed transition rules.

Illustrative mode-separation fields include: mode_class, mode_transition_id, prior_mode_ref, requested_mode_ref, authority_manifest_ref, authority_scope_digest, purpose_digest, task_ref, draft_artifact_ref, confirmation_digest_ref, dual_approval_ref, policy_profile_digest, verifier_profile_ref, live_permit_ref, act_window, freshness_value, escalation_rule, allowed_action_class, prohibited_action_class, output_policy_digest, and mode_status_reason.

In some embodiments, read mode permits one or more of retrieval, indexing, summarization, clustering, prioritization, ranking, extraction of bounded non-sensitive fields, generation of references, generation of provenance pointers, or production of a human-visible summary, while prohibiting transmission of a commitment, approval, purchase completion, settlement submission, refund, reversal, account change, or other protected execution event.

In some embodiments, draft mode permits preparation of a proposed message, purchase request, renewal proposal, refund proposal, dispute package, settlement-adjacent payload, confirmation summary, or other action candidate, while prohibiting final transmission, approval, execution, commit, send, settle, release of funds, or binding submission to a downstream merchant, processor, issuer, acquirer, wallet, or enterprise system unless a designated mode transition to act mode is satisfied.

In some embodiments, act mode is permitted only upon satisfaction of one or more act-mode predicates including: a live permit, a fresh authority manifest, a fresh human-confirmation digest, a dual approval, a freshness threshold, a measurement continuity check, a verifier-profile requirement, a category-specific rule, a spend-cap rule, a merchant-of-record rule, or a task-specific escalation rule. Absent satisfaction of the applicable act-mode predicates, the system fail-closes by denying, holding, freezing, or requiring renewed confirmation for the requested act-mode transition.

A mode transition may be represented by a signed mode-transition record or equivalent verifier-usable record cryptographically bound to at least: (i) a prior mode, (ii) a requested mode, (iii) an authority manifest or authority-scope digest, (iv) a task reference or purpose digest, (v) a freshness value or act window, and (vi) a canonicalized purchase context, transaction-scoped context, or equivalent execution-context digest. In some embodiments, a mode-transition record is embedded in, referenced by, or summarized within a CEB, a selective-disclosure export, a dispute package, or another evidence product.

In illustrative embodiments, a read-mode or draft-mode result may be bound to a draft artifact digest, recommendation digest, or summary digest so that a later verifier can determine whether a downstream act-mode event was consistent with a previously reviewed or confirmed draft artifact. Where a material variance is detected between a draft artifact and a later act-mode payload, the system may require renewed confirmation, renewed policy evaluation, renewed step-up authentication, or a new act-mode permit.

In some embodiments, mode separation is applied to one or more action classes including: send, approve, commit, spend, settle, capture, refund, reverse, dispute, reallocate, update payment class, update merchant-of-record, update destination, or modify a recurring-charge baseline. Different action classes may require different mode-transition rules, different freshness thresholds, different verifier profiles, or different human-confirmation requirements.

In some embodiments, audience-specific evidence packages include a mode-state view, a transition-lineage view, or a draft-to-act consistency view showing that a protected action was executed only after satisfaction of an applicable act-mode rule and that any omitted data was omitted under policy rather than by loss of evidence. Such packages may preserve proof of mode separation without disclosing hidden prompts, internal reasoning traces, or non-essential source materials.

Illustrative workflows include, without limitation: a personal agent operating in read mode to retrieve policy-bounded vendor or budget information; the agent operating in draft mode to prepare a proposed purchase or approval artifact; a human or designated approver reviewing a confirmation summary; and the system permitting transition to act mode only after a live permit or required approval is obtained, after which a protected execution event may proceed and be bound into a CEB or related evidence substrate.

The invention claimed is:

1. A computer system comprising one or more processors and a non-transitory memory storing instructions that, when executed by the one or more processors, cause the computer system to implement an attested checkout compliance gateway comprising a checkout sidecar, a payment execution enclave, a confinement controller, a step-up authentication orchestrator, a compliance evidence bundle generator, a compliance exporter, and a policy enforcement controller, wherein execution of the instructions causes the attested checkout compliance gateway to perform operations comprising:

(a) intercepting, by the checkout sidecar deployed in front of a merchant checkout interface, a purchase request, classifying purchase-request fields, and withholding from a merchant application process any field classified as primary account number data or sensitive authentication data;

(b) performing, by the payment execution enclave operating inside a trusted compute boundary selected from the group consisting of a trusted execution environment (TEE), a hardware security module (HSM), and a combination thereof, operations comprising:

(i) verifying remote attestation of the trusted compute boundary, including comparing a reported measurement to an expected measurement referenced by a policy manifest, a version manifest, or an equivalent trust-policy object, prior to unsealing a payment credential;

(ii) unsealing the payment credential only within the trusted compute boundary and denying unseal upon attestation failure, mismatch, or revocation; and (iii) generating or obtaining, within the trusted compute boundary, a network-routable payment instrument derived from the payment credential while enforcing an egress policy that forbids export of primary account number data and sensitive authentication data outside the trusted compute boundary;

(c) computing, by the confinement controller and for the purchase, a data-flow confinement digest from at least a measured egress policy digest and a process-boundary classification digest, the process-boundary classification digest identifying processes authorized to access the payment credential;

(d) responsive to evaluation under an applicable policy profile, either:

(i) perform step up authentication and obtain machine verifiable authentication evidence comprising at least an authentication result code and a cryptographic verifier output of signature bound to a canonical representation of an authentication transcript; of performing, by the step-up authentication orchestrator, step-up authentication and obtaining machine-verifiable authentication evidence comprising at least an authentication result code and a cryptographic verifier output or signature bound to a canonical representation of an authentication transcript; or (ii) generating, by the step-up authentication orchestrator, a signed policy-evaluation record cryptographically bound to a canonicalized purchase context and indicating that step-up authentication was not required for the purchase;

(e) constructing, by the compliance evidence bundle generator, a Compliance Evidence Bundle (CEB) comprising at least:

(i) an attestation measurement associated with the trusted compute boundary used for the purchase, (ii) the data-flow confinement digest, (iii) an authorization trace digest binding an authorization outcome to a canonicalized purchase context that excludes primary account number data and sensitive authentication data, and (iv) either the machine-verifiable authentication evidence or the signed policy-evaluation record, and digitally signing the CEB with a key protected by the trusted compute boundary over a signature scope that includes at least a transaction identifier or nonce, the attestation measurement, the data-flow confinement digest, and the authorization trace digest;

(f) outputting, by the compliance exporter, an auditor-mode CEB and a selective-disclosure CEB view that redacts personal data while preserving verifiability of at least the attestation measurement, the data-flow confinement digest, the authorization trace digest, and the machine-verifiable authentication evidence or the signed policy-evaluation record; and (g) asserting, by the policy enforcement controller, fail-closed behavior and blocking settlement submission, merchant-side purchase completion, or both, when remote attestation fails, when export of primary account number data or sensitive authentication data outside the trusted compute boundary is detected, when required machine-verifiable authentication evidence is absent or invalid, or when step-up authentication is not required and the signed policy-evaluation record is absent or invalid.

2. The system of claim 1, wherein the checkout sidecar terminates mutually authenticated transport, enforces an allow-list of egress endpoints for payment processing, and forwards to the merchant application process only a non-sensitive derivative of the purchase request in which any field classified as primary account number data or sensitive authentication data is removed or replaced with a tokenization surrogate.

3. The system of claim 1, wherein the network-routable payment instrument comprises at least one of a network token, a tokenization surrogate, and a payment cryptogram generated within the trusted compute boundary.

4. The system of claim 1, wherein the data-flow confinement digest is further computed from a memory-access audit digest generated within the trusted compute boundary.

5. The system of claim 1, wherein the compliance exporter outputs a scope-reduction certificate comprising:

(i) a signed assertion indicating that the merchant application process did not store, process, or transmit primary account number data and that sensitive authentication data was not exported to the merchant application process; and (ii) verifiable references to the attestation measurement and the data-flow confinement digest, wherein the signed assertion is generated based at least on the attestation measurement, the data-flow confinement digest, and at least one of the measured egress policy digest, the process-boundary classification digest, or a memory-access audit digest generated within the trusted compute boundary.

6. The system of claim 1, wherein, when step-up authentication is performed using a three-domain secure (3DS) protocol, the machine-verifiable authentication evidence includes at least one of an issuer-signed result, a directory-server signed result, and an access-control-server signed result bound to a 3DS transaction identifier.

7. The system of claim 1, further comprising a point-of-sale device having a secure element, wherein the network-routable payment instrument comprises an EMV authorization cryptogram generated by the secure element, and wherein the authorization trace digest binds the EMV authorization cryptogram to the canonicalized purchase context.

8. The system of claim 1, wherein the operations further comprise caching, by the compliance exporter, an auditor-mode CEB locally in an offline mode and later exporting, by the compliance exporter, the auditor-mode CEB upon reconnection, the auditor-mode CEB including an offline indicator and a bounded time window for offline validity.

9. The system of claim 1, wherein the operations further comprise outputting, by the compliance exporter, a dispute-ready evidence view that includes the authorization trace digest and, in a form usable for chargeback rebuttal and fraud investigation, either (i) machine-verifiable authentication evidence when step-up authentication is performed or (ii) a signed policy-evaluation record when step-up authentication is not required.

10. The system of claim 1, wherein verifying remote attestation comprises verifying an endorsement chain for an attestation key, checking revocation status, and comparing the reported measurement to an expected measurement referenced by the policy manifest, the version manifest, or the equivalent trust-policy object.

11. A computer-implemented method comprising:

(a) intercepting, at a checkout sidecar deployed in front of a merchant checkout interface, a purchase request, classifying purchase-request fields, and withholding from a merchant application process any field classified as primary account number data or sensitive authentication data;

(b) verifying remote attestation of a trusted compute boundary, including comparing a reported measurement to an expected measurement referenced by a policy manifest, a version manifest, or an equivalent trust-policy object, prior to unsealing a payment credential; unsealing the payment credential only within the trusted compute boundary; and denying unseal upon attestation failure, mismatch, or revocation;

(c) generating or obtaining, within the trusted compute boundary, a network-routable payment instrument derived from the payment credential while enforcing an egress policy that forbids export of primary account number data and sensitive authentication data outside the trusted compute boundary;

(d) computing, for the purchase, a data-flow confinement digest from at least a measured egress policy digest and a process-boundary classification digest, the process-boundary classification digest identifying processes authorized to access the payment credential;

(e) responsive to evaluation under an applicable policy profile, either:

(i) performing step-up authentication and obtaining machine-verifiable authentication evidence comprising at least an authentication result code and a cryptographic verifier output or signature bound to a canonical representation of an authentication transcript; or (ii) generating a signed policy-evaluation record cryptographically bound to a canonicalized purchase context and indicating that step-up authentication was not required for the purchase;

(f) constructing a Compliance Evidence Bundle (CEB) comprising at least an attestation measurement associated with the trusted compute boundary used for the purchase, the data-flow confinement digest, an authorization trace digest binding an authorization outcome to a canonicalized purchase context that excludes primary account number data and sensitive authentication data, and either the machine-verifiable authentication evidence or the signed policy-evaluation record, and digitally signing the CEB with a key protected by the trusted compute boundary over a signature scope that includes at least a transaction identifier or nonce, the attestation measurement, the data-flow confinement digest, and the authorization trace digest;

(g) exporting an auditor-mode CEB and a selective-disclosure CEB view that redacts personal data while preserving verifiability of at least the attestation measurement, the data-flow confinement digest, the authorization trace digest, and the machine-verifiable authentication evidence or the signed policy-evaluation record; and (h) asserting fail-closed behavior and blocking settlement submission, merchant-side purchase completion, or both, when remote attestation fails, when export of primary account number data or sensitive authentication data outside the trusted compute boundary is detected, when required machine-verifiable authentication evidence is absent or invalid, or when step-up authentication is not required and the signed policy-evaluation record is absent or invalid.

12. The method of claim 11, wherein withholding sensitive payment credentials from the merchant application process comprises replacing a payment credential field with a tokenization surrogate before forwarding a non-sensitive derivative of the request for further merchant processing.

13. The method of claim 11, wherein the data-flow confinement digest is further computed from a memory-access audit digest generated within the trusted compute boundary.

14. The method of claim 11, wherein, when step-up authentication is performed, the step-up authentication comprises executing a 3DS authentication flow and obtaining machine-verifiable authentication evidence that includes a signed result bound to a 3DS transaction identifier.

15. The method of claim 11, wherein generating the network-routable payment instrument comprises generating an EMV authorization cryptogram within a secure element of a point-of-sale device and binding the EMV authorization cryptogram into the authorization trace digest.

16. The method of claim 11, further comprising producing a scope-reduction certificate comprising:

(i) a signed assertion indicating that the merchant application process did not store, process, or transmit primary account number data and that sensitive authentication data was not exported to the merchant application process; and (ii) verifiable references to the attestation measurement and the data-flow confinement digest, wherein the signed assertion is generated based at least on the attestation measurement, the data-flow confinement digest, and at least one of the measured egress policy digest, the process-boundary classification digest, or a memory-access audit digest generated within the trusted compute boundary.

17. The method of claim 11, wherein verifying remote attestation comprises verifying an endorsement chain for an attestation key, checking revocation status, and comparing the reported measurement to an expected measurement referenced by the policy manifest, the version manifest, or the equivalent trust-policy object.

18. The method of claim 11, wherein exporting the selective-disclosure CEB view comprises redacting personal data fields while retaining verifiable digests for the canonicalized purchase context, the authorization trace digest, and the attestation measurement.

19. The method of claim 11, wherein the selective-disclosure CEB view includes a zero-knowledge proof attesting satisfaction of at least one policy predicate selected from an age threshold, a residency constraint, a spend-cap constraint, and a merchant-category constraint, without revealing underlying raw values.

20. The method of claim 11, wherein asserting fail-closed behavior comprises emitting a machine-readable failure record including a failure code selected from attestation_failure, minimization_violation, authentication_evidence_invalid, authentication_evidence_missing, policy_evaluation_record_invalid, and policy_evaluation_record_missing.

21. A non-transitory computer-readable medium storing instructions that, when executed by one or more processors, cause a computer system to:

(a) intercept, at a checkout sidecar deployed in front of a merchant checkout interface, a purchase request, classify purchase-request fields, and withhold from a merchant application process any field classified as primary account number data or sensitive authentication data;

(b) verify remote attestation of a trusted compute boundary, including comparing a reported measurement to an expected measurement referenced by a policy manifest, a version manifest, or an equivalent trust-policy object, prior to unsealing a payment credential; unseal the payment credential only within the trusted compute boundary; and deny unseal upon attestation failure, mismatch, or revocation;

(c) generate or obtain, within the trusted compute boundary, a network-routable payment instrument derived from the payment credential while enforcing an egress policy that forbids export of primary account number data and sensitive authentication data outside the trusted compute boundary;

(d) compute, for the purchase, a data-flow confinement digest from at least a measured egress policy digest and a process-boundary classification digest, the process-boundary classification digest identifying processes authorized to access the payment credential;

(e) responsive to evaluation under an applicable policy profile, either:

(i) perform step-up authentication and obtain machine-verifiable authentication evidence comprising at least an authentication result code and a cryptographic verifier output or signature bound to a canonical representation of an authentication transcript; or (ii) generate a signed policy-evaluation record cryptographically bound to a canonicalized purchase context and indicating that step-up authentication was not required for the purchase;

(f) construct a Compliance Evidence Bundle (CEB) comprising at least an attestation measurement associated with the trusted compute boundary used for the purchase, the data-flow confinement digest, an authorization trace digest binding an authorization outcome to a canonicalized purchase context that excludes primary account number data and sensitive authentication data, and either the machine-verifiable authentication evidence or the signed policy-evaluation record, and digitally sign the CEB with a key protected by the trusted compute boundary over a signature scope that includes at least a transaction identifier or nonce, the attestation measurement, the data-flow confinement digest, and the authorization trace digest;

(g) export an auditor-mode CEB and a selective-disclosure CEB view that redacts personal data while preserving verifiability of at least the attestation measurement, the data-flow confinement digest, the authorization trace digest, and the machine-verifiable authentication evidence or the signed policy-evaluation record; and (h) assert fail-closed behavior and block settlement submission, merchant-side purchase completion, or both, when remote attestation fails, when export of primary account number data or sensitive authentication data outside the trusted compute boundary is detected, when required machine-verifiable authentication evidence is absent or invalid, or when step-up authentication is not required and the signed policy-evaluation record is absent or invalid.

22. The non-transitory computer-readable medium of claim 21, wherein the instructions, when executed, further cause the computer system to terminate mutually authenticated transport, enforce an allow-list of egress endpoints for payment processing, and forward to the merchant application process only a non-sensitive derivative of the purchase request in which any field classified as primary account number data or sensitive authentication data is removed or replaced with a tokenization surrogate.

23. The non-transitory computer-readable medium of claim 21, wherein the data-flow confinement digest is further computed from a memory-access audit digest generated within the trusted compute boundary.

* * * * *